US012730523B2

(12) United States Patent
Liu et al.

(10) Patent No.: US 12,730,523 B2
(45) Date of Patent: Sep. 8, 2026

(54) DEVICE CONTROL METHOD AND ELECTRONIC DEVICE

(71) Applicant: HUAWEI TECHNOLOGIES CO., LTD., Shenzhen (CN)

(72) Inventors: Wei Liu, Wuhan (CN); Xiaotian Zhang, Wuhan (CN); Ji Huang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 262 days.

(21) Appl. No.: 18/683,154

(22) PCT Filed: Aug. 16, 2022

(86) PCT No.: PCT/CN2022/112823
§ 371 (c)(1),
(2) Date: Feb. 12, 2024

(87) PCT Pub. No.: WO2023/020497
PCT Pub. Date: Feb. 23, 2023

(65) Prior Publication Data

US 2025/0004575 A1 Jan. 2, 2025

(30) Foreign Application Priority Data

Aug. 17, 2021 (CN) ......................... 202110940673.5

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/017* (2013.01); *G06F 3/14* (2013.01);
(Continued)

(58) Field of Classification Search
CPC .......... G06F 3/017; G06F 3/0346; G06F 3/14; H04N 21/42208; H04N 21/4222; H04N 21/42222; H04N 21/4312
See application file for complete search history.

(56) References Cited

U.S. PATENT DOCUMENTS 9,389,691 B2 * 7/2016 Gärdenfors ........... G06F 3/0346
10,394,331 B2 * 8/2019 Gardenfors ........... H04W 4/027
(Continued)

FOREIGN PATENT DOCUMENTS

CN 202587114 U 12/2012
CN 103002142 A 3/2013
(Continued)

*Primary Examiner* — Michael Pervan
(74) *Attorney, Agent, or Firm* — Leydig, Voit & Mayer, Ltd.

(57) ABSTRACT

A device control method and an electronic device are provided. The method includes: A first electronic device establishes a connection to a second electronic device in response to a preset gesture operation; the second electronic device returns first information to the first electronic device, where the first information includes related information of the second electronic device and/or related information of a first application and/or a first function on the second electronic device; and the first electronic device displays a control interface based on the first information, where the control interface is for controlling the second electronic device. In this manner, a user performs the preset gesture operation on the first electronic device, to invoke the first information of the second electronic device, to display the control interface for controlling the second electronic device. In this way, an operation is convenient, and user experience is good.

18 Claims, 18 Drawing Sheets

(51) Int. Cl.

| | |
|---|---|
| ***G06F 3/14*** | (2006.01) |
| ***H04N 21/422*** | (2011.01) |
| ***H04N 21/431*** | (2011.01) |

(52) U.S. Cl.

CPC ... *H04N 21/42208* (2013.01); *H04N 21/4222* (2013.01); *H04N 21/42222* (2013.01); *H04N 21/4312* (2013.01)

(56) References Cited

U.S. PATENT DOCUMENTS

| | | | | |
|---|---|---|---|---|
| 2014/0380187 | A1* | 12/2014 | Gardenfors | G06F 3/0488 715/748 |
| 2016/0320856 | A1* | 11/2016 | Gardenfors | G06F 3/017 |
| 2016/0351047 | A1 | 12/2016 | Han et al. | |
| 2018/0270442 | A1 | 9/2018 | Park | |
| 2019/0182530 | A1 | 6/2019 | Lee | |
| 2022/0035498 | A1 | 2/2022 | Kim et al. | |

FOREIGN PATENT DOCUMENTS

| | | | |
|---|---|---|---|
| CN | 103634645 | A | 3/2014 |
| CN | 103856798 | A | 6/2014 |
| CN | 104207760 | A | 12/2014 |
| CN | 102404637 | B | 4/2015 |
| CN | 104703008 | A | 6/2015 |
| CN | 106033255 | A | 10/2016 |
| CN | 109274563 | A | 1/2019 |
| CN | 110471581 | A | 11/2019 |
| CN | 110519444 | A | 11/2019 |
| CN | 110597473 | A | 12/2019 |
| CN | 111427527 | A | 7/2020 |
| CN | 112217872 | A | 1/2021 |
| CN | 112351412 | A | 2/2021 |
| CN | 112529557 | A | 3/2021 |
| JP | 2010050792 | A | 3/2010 |
| WO | 2017049768 | A1 | 3/2017 |
| WO | 2020116845 | A1 | 6/2020 |

* cited by examiner

FIG. 3

DEVICE CONTROL METHOD AND ELECTRONIC DEVICE

CROSS-REFERENCE TO RELATED APPLICATIONS

This application is a national stage of International Application No. PCT/CN2022/112823, filed on Aug. 16, 2022, which claims priority to Chinese Patent Application No. 202110940673.5, filed on Aug. 17, 2021. Both of the aforementioned applications are hereby incorporated by reference in their entireties.

TECHNICAL FIELD

This application relates to the field of electronic technologies, and in particular, to a device control method and an electronic device.

BACKGROUND

Currently, a device (for example, a television) is controlled mainly by using a remote control. The device receives a signal from the remote control to implement a related function. This manner is conventional and inconvenient. For example, when the remote control is lost, the device cannot be remotely controlled; and it is inefficient and inconvenient to input a text or play a game on the device by using the remote control.

Currently, there is a solution that is to install an application on a mobile phone to simulate a remote control to control a device. Generally, an operation interface, an operation manner, and the like that are simulated by the application on the mobile phone are the same as those of the remote control. Only the mobile phone replaces the remote control, but control experience of a user is not improved. In addition, different devices adapt to different remote controlling applications. As a result, remote controlling applications corresponding to all devices need to be installed on the mobile phone. This occupies memory. In addition, when the user wants to remotely control a device, the user further needs to find, on the mobile phone, a corresponding application for remotely controlling the device, start the application, and then remotely control the device, which is cumbersome.

SUMMARY

Embodiments of this application provide a device control method and an electronic device, to improve operation experience of remotely controlling a device.

According to a first aspect, a device control method is provided, and is applicable to a system including a first electronic device and a second electronic device. The method includes: The first electronic device establishes a connection to the second electronic device in response to a preset gesture operation: the second electronic device returns first information to the first electronic device, where the first information includes related information of the second electronic device and/or related information of a first application and/or a first function on the second electronic device; and the first electronic device displays a control interface based on the first information, where the control interface is for controlling the second electronic device.

That is, if a user wants to use the first electronic device to control the second electronic device, the user only needs to perform the preset gesture operation on the first electronic device, to invoke the control interface for controlling the second electronic device, and control the second electronic device through the control interface. The device control method is convenient, and the user does not need to find, from many applications on the first electronic device, an application for remotely controlling the second electronic device, and then start the application to remotely control the second electronic device. In this way, user experience is good.

According to a second aspect, a device control method is provided, and is applied to a first electronic device. The method includes: The first electronic device establishes a connection to a second electronic device in response to a preset gesture operation: the first electronic device receives first information sent by the second electronic device, where the first information includes related information of the second electronic device and/or related information of a first application and/or a first function on the second electronic device; and the first electronic device displays a control interface based on the first information, where the control interface is for controlling the second electronic device.

That is, if a user wants to use the first electronic device to control the second electronic device, the user only needs to perform the preset gesture operation on the first electronic device, to invoke the control interface for controlling the second electronic device, and control the second electronic device through the control interface. The device control method is convenient, and user experience is good.

In an embodiment, that the first electronic device establishes a connection to a second electronic device in response to a preset gesture operation includes: The first electronic device sends a connection request to the second electronic device in response to the preset gesture operation, where the connection request carries a preset identifier, and the preset identifier indicates the second electronic device to return the first information.

For example, it is assumed that the preset gesture operation is referred to as a Summon. The preset identifier carried in the connection request may be a Summon identifier. In this way, the second electronic device receives the connection request, and may determine, by using the Summon identifier, that the first electronic device intends to remotely control the second electronic device. Therefore, the second electronic device returns the first information, so that the first electronic device may display, based on the first information, the control interface for controlling the second electronic device, to control the second electronic device.

For example, the preset gesture operation includes: swinging a first edge of the first electronic device around a first axis as a rotation axis, where the first edge is an edge that is of the first electronic device and that is closest to the user when the user holds the first electronic device; and the first axis passes through the central point of the first electronic device and is parallel to the first edge.

The preset gesture operation meets at least one of the following:

- a swing angle at which the first edge is swung by using the first axis as the rotation axis falls within a preset angle range;
- a swing angular velocity at which the first edge is swung by using the first axis as the rotation axis falls within a preset angular velocity range;
- a quantity of swing times for which the first edge is swung within preset duration by using the first axis as the rotation axis is greater than a preset quantity of times;
- a time interval at which the first edge is continuously swung twice by using the first axis as the rotation axis is less than a preset time interval; and a tilt angle of the first edge in a horizontal direction is less than a preset angle when the first edge is swung by using the first axis as the rotation axis.

It should be noted that, in addition to the foregoing gesture operations, the preset gesture operation may be another type of operation. This is not limited in this application.

In an embodiment, that the first electronic device establishes a connection to a second electronic device in response to a preset gesture operation includes: The first electronic device determines the second electronic device from a surrounding device in response to the preset gesture operation, and establishes the connection to the second electronic device. The second electronic device meets at least one of the following conditions: The second electronic device supports a distributed transfer service, the second electronic device is a trusted device of the first electronic device, the second electronic device is located within a preset orientation range of the first electronic device, a distance between the second electronic device and the first electronic device falls within a preset distance range, and the second electronic device is specified by the user. That the second electronic device supports a distributed transfer service means that the second electronic device can transfer an application or an application interface, or a function or a function interface on the second electronic device to another electronic device.

In other words, the first electronic device may determine the second electronic device from the surrounding device in response to the preset gesture operation, and display the control interface for controlling the second electronic device. The user may control the second electronic device through the control interface. For example, the user has a television, a speaker, a notebook computer, and the like at home. When the user wants to use a mobile phone to remotely control the television, the user may point the mobile phone at the television (where the television is located within a preset orientation range of the mobile phone), and perform the preset gesture operation on the mobile phone. In this way, the mobile phone may automatically display the control interface for controlling the television. In this manner, the user does not need to find, from many applications on the mobile phone, an application for remotely controlling the television, and then start the application to remotely control the television. In this way, an operation is convenient, and user experience is good.

In an embodiment, that the second electronic device is a trusted device of the first electronic device includes at least one of the following: logging in to a same account as the first electronic device, being connected to a same local area network as the first electronic device, having been connected to or interacted with the first electronic device, and being located within a same geographic area as the first electronic device. In this manner, it can be ensured that a connected device is secure, to protect user privacy.

In an embodiment, that the second electronic device is located within a preset orientation range of the first electronic device includes: The second electronic device is located within a preset angle range that is of the first electronic device and that uses a direction of a second axis as a center, where the second axis passes through the central point of the first electronic device and is perpendicular to the first edge, and the first edge is the edge that is of the first electronic device and that is close to the user when the user holds the first electronic device. For example, the user has a television, a speaker, a notebook computer, and the like at home. When the user wants to use a mobile phone to remotely control the television, the user may point the mobile phone at the television (where the television is located within a preset orientation range of the mobile phone), and perform the preset gesture operation on the mobile phone. In this way, the mobile phone may automatically display the control interface for controlling the television. In this manner, the user does not need to find, from many applications on the mobile phone, an application for remotely controlling the television, and then start the application to remotely control the television. In this way, an operation is convenient, and user experience is good.

For example, the first information includes at least one of the following:

- a current running status of the second electronic device;
- a historical watching or historical use record of the second electronic device;
- content recommended by the second electronic device based on the historical watching record;
- an application and/or a function that have/has the distributed transfer service on the second electronic device;
- a currently running application on the second electronic device;
- an application displayed at a topmost layer on the second electronic device; and
- the application and/or the function that have/has the distributed transfer service and that are/is used by the second electronic device last time.

The application and/or the function that have/has the distributed transfer service means that the application and/or the function can transfer an interface of the application and/or the function to another device.

In this case, the control interface generated by the first electronic device based on the first information may be a general-purpose control interface, and the general-purpose control interface may be for controlling the entire second electronic device.

For example, the related information of the first application and/or the first function includes:

- a current running status of the first application and/or the first function;
- a historical use record of the first application and/or the first function;
- content recommended by the first application and/or the first function based on the historical use record;
- a function having the distributed transfer service in the first application; and
- a function that has the distributed transfer service and that is used in the first application last time.

In this case, the control interface generated by the first electronic device based on the first information may be a personalized control interface of the first application and/or the first function, and the personalized control interface may be for controlling the first application and/or the first function.

In some embodiments, display content of the control interface on the first electronic device is related to the current running status and/or a current display interface of the second electronic device.

For example, when the current display interface of the second electronic device is a main interface, the control interface on the first electronic device is a general-purpose control interface, where the general-purpose control interface includes the related information of the second electronic device, and the general-purpose control interface is for controlling the entire second electronic device. For example, when the television currently displays the main interface, and the user performs the preset gesture operation on the mobile phone, the mobile phone displays the general-purpose control interface for controlling the entire television.

For example, when the current display interface of the second electronic device is an interface of the first application and/or the first function, the control interface on the first electronic device is the general-purpose control interface or a personalized control interface corresponding to the first application and/or the first function, where the personalized control interface includes the related information of the first application and/or the first function, and the personalized control interface is for controlling the first application and/or the first function. For example, when the television currently displays the interface of the first application, and the user performs the preset gesture operation on the mobile phone, the mobile phone displays the general-purpose control interface or the personalized control interface of the first application. For example, if the first application supports the distributed transfer service, the mobile phone displays the personalized control interface of the first application; or if the first application does not support the distributed transfer service, the mobile phone displays the general-purpose control interface.

For example, when the current running status of the second electronic device is a power-off state, the control interface on the first electronic device includes a button for indicating to control the second electronic device to be powered on.

For example, when the current running status of the second electronic device is a screen-off state, the control interface on the first electronic device includes a button for indicating to control the second electronic device to be screened on.

According to a third aspect, a device control method is further provided, and is applied to a second electronic device. The method includes: The second electronic device establishes a connection to a first electronic device; and the second electronic device sends first information to the first electronic device. The first information includes related information of the second electronic device and/or related information of a first application and/or a first function on the second electronic device. The first information is for generating a control interface, and the control interface can be for controlling the second electronic device.

In an embodiment of this application, the second electronic device supports a distributed transfer service. For example, the second electronic device may transfer an application or an application interface, or a function or a function interface to the first electronic device, so that the first electronic device can control the second electronic device.

In an embodiment, before the second electronic device sends the first information to the first electronic device, the method further includes: The second electronic device receives a request sent by the first electronic device, where the request carries a preset identifier, and the preset identifier indicates the second electronic device to return the first information.

In an embodiment, the first information is related to a current running status and/or a current display interface of the second electronic device.

In an embodiment, when the current display interface of the second electronic device is a main interface, the first information includes the related information of the second electronic device, where the first information is for generating a general-purpose control interface, and the general-purpose control interface is for controlling the entire second electronic device; or when the current display interface of the second electronic device is an interface of the first application and/or the first function, the first information includes the related information of the first application and/or the first function, where the first information is for generating a personalized control interface of the first application and/or the first function, and the personalized control interface is for controlling the first application and/or the first function; or when the current running status of the second electronic device is a power-off state, the first information includes information indicating that the second electronic device is currently powered off, where the first information is for generating the control interface, and the control interface includes a button for controlling the second electronic device to be powered on; or when the current running status of the second electronic device is a screen-off state, the first information includes information indicating that the second electronic device is currently screened off, where the first information is for generating the control interface, and the control interface includes a button for controlling the second electronic device to be screened on.

In an embodiment, the first information includes at least one of the following:

- the current running status of the second electronic device;
- a historical watching or historical use record of the second electronic device;
- content recommended by the second electronic device based on the historical watching record;
- an application and/or a function that have/has the distributed transfer service on the second electronic device;
- a currently running application on the second electronic device;
- an application displayed at a topmost layer on the second electronic device; and
- the application and/or the function that have/has the distributed transfer service and that are/is used by the second electronic device last time.

The application and/or the function that support/supports the distributed transfer service means that the application and/or the function can transfer an interface of the application and/or the function to another device.

In an embodiment, the related information of the first application and/or the first function includes:

- a current running status of the first application and/or the first function;
- a historical use record of the first application and/or the first function;
- content recommended by the first application and/or the first function based on the historical use record;
- a function having the distributed transfer service in the first application; and
- a function that has the distributed transfer service and that is used in the first application last time.

In an embodiment, N icons are displayed on the second electronic device, and each icon corresponds to a corresponding application and/or function; identifiers are respectively displayed on M icons in the N icons, and the identifiers are for prompting that applications and/or functions corresponding to the M icons support the distributed transfer service, where N and M are positive integers, and N is greater than or equal to M.

The first application and/or the first function are/is an application and/or a function corresponding to a first icon in the M icons.

That the application and/or the function support/supports the distributed transfer service includes: The application and/or the function can transfer the interface of the application and/or the function to the another device.

According to a fourth aspect, a communication system is further provided. The communication system includes a first electronic device and a second electronic device.

The first electronic device includes a processor and a memory. The memory stores one or more computer programs, and the one or more computer programs include instructions. When the instructions are executed by the processor, the first electronic device is enabled to perform the method according to the second aspect.

The second electronic device includes a processor and a memory. The memory stores one or more computer programs, and the one or more computer programs include instructions. When the instructions are executed by the processor, the second electronic device is enabled to perform the method according to the third aspect.

According to a fifth aspect, an electronic device is further provided. The electronic device includes:

a processor, a memory, and one or more programs, where the one or more programs are stored in the memory, the one or more programs include instructions, and when the instructions are executed by the processor, the electronic device is enabled to perform steps of the method according to the second aspect.

According to a sixth aspect, an electronic device is further provided. The electronic device includes:

a processor, a memory, and one or more programs, where the one or more programs are stored in the memory, the one or more programs include instructions, and when the instructions are executed by the processor, the electronic device is enabled to perform steps of the method according to the third aspect.

According to a seventh aspect, a computer-readable storage medium is further provided. The computer-readable storage medium includes a computer program. When the computer program is run on an electronic device, the electronic device is enabled to perform the method according to the first aspect; or when the computer program is run on an electronic device, the electronic device is enabled to perform the method according to the second aspect; or when the computer program is run on an electronic device, the electronic device is enabled to perform the method according to the third aspect.

According to an eighth aspect, a program product is further provided, and includes instructions. When the instructions are run on a computer, the computer is enabled to perform the method according to the first aspect; or when the instructions are run on a computer, the computer is enabled to perform the method according to the second aspect; or when the instructions are run on a computer, the computer is enabled to perform the method according to the third aspect.

According to a ninth aspect, an embodiment of this application further provides a chip. The chip is coupled to a memory in an electronic device, and is configured to: invoke a computer program stored in the memory and execute the technical solution according to any one of the first aspect and the possible designs of the first aspect in embodiments of this application; or is configured to invoke a computer program stored in the memory and execute the technical solution according to any one of the second aspect and the possible designs of the second aspect in embodiments of this application; or is configured to invoke a computer program stored in the memory and execute the technical solution according to any one of the third aspect and the possible designs of the third aspect in embodiments of this application. "Couple" in embodiments of this application means that two components are directly or indirectly combined with each other.

According to a tenth aspect, a graphical user interface on an electronic device is further provided. The electronic device includes a display, one or more memories, and one or more processors. The one or more processors are configured to execute one or more computer programs stored in the one or more memories. The graphical user interface includes a graphical user interface displayed when the electronic device performs the method according to the first aspect, the method according to the second aspect, or the method according to the third aspect.

For beneficial effects of the third aspect to the tenth aspect, refer to the beneficial effects of the first aspect and the second aspect. Details are not described again.

BRIEF DESCRIPTION OF DRAWINGS

FIG. 2 is a schematic diagram of a hardware structure of an electronic device according to an embodiment of this application;

FIG. 3 is a schematic diagram of a software structure of an electronic device according to an embodiment of this application;

DESCRIPTION OF EMBODIMENTS

Figures 1, 1A:
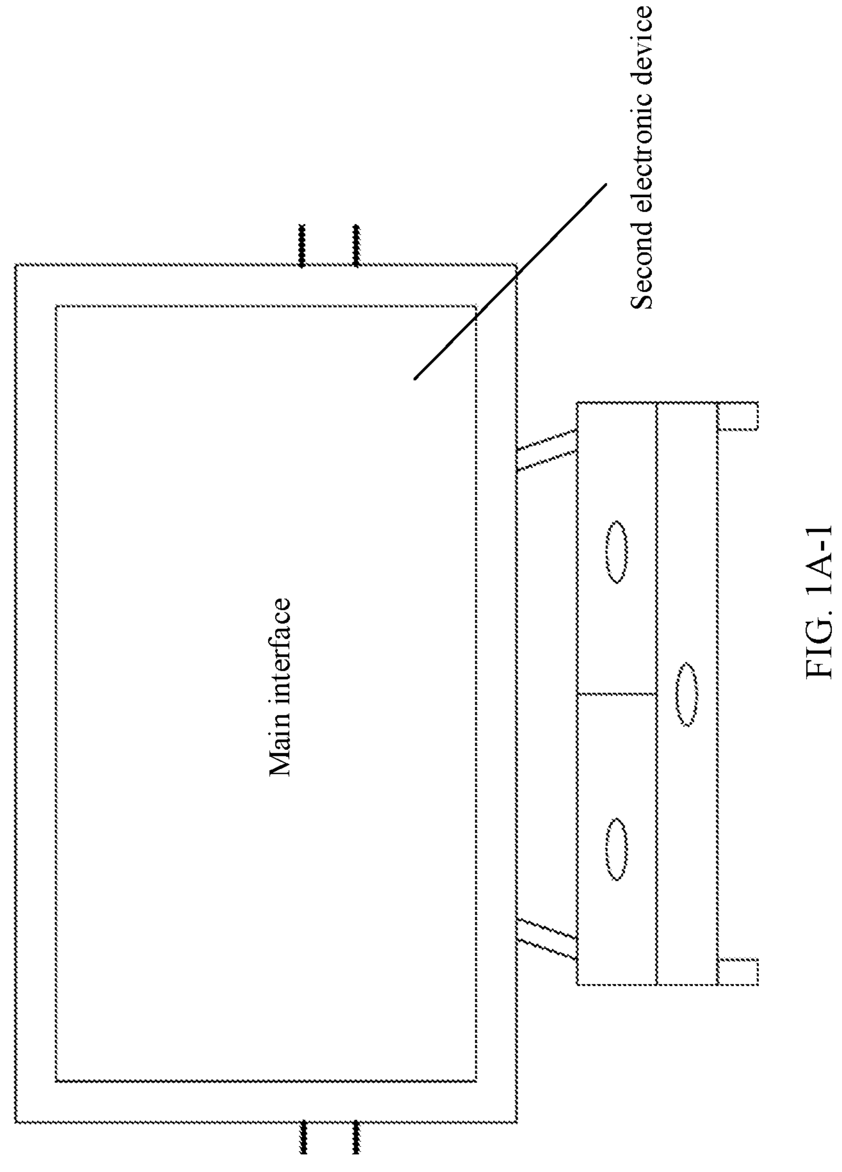
FIG. 1A-1 to FIG. 1B-2 are schematic diagrams of an application scenario according to an embodiment of this application.

The following describes some terms in embodiments of this application, to facilitate understanding of a person skilled in the art.

(1) An application (app for short) is a software program that can implement one or more specific functions. Generally, a plurality of applications such as an instant messaging application, a video playing application, an audio application, and an image capture application, may be installed on an electronic device. The instant messaging application may include, for example, a Messaging application, a MeeTime application, WeChat®, WhatsApp Messenger®, Line®, Instagram, Kakao Talk®, and DingTalk®. The image capture application may include, for example, a Camera application (a system camera or a third-party camera application). The video playing application may include, for example, YouTube®, Twitter®, TikTok®, iQIYI®, and Tencent Video®. The audio playing application may include, for example, Google Music®, KuGou Music®, XiaMi®, and QQ Music®. An application in the following embodiments may be an application installed before the electronic device is delivered, or may be an application downloaded from a network or obtained from another electronic device by a user in a process of using the electronic device.

(2) In embodiments of this application, "at least one" means one or more, and "a plurality of" means two or more. "And/or" describes an association relationship between associated objects and indicates that three relationships may exist. For example, A and/or B may indicate the following three cases: Only A exists, both A and B exist, and only B exists, where A and B may be singular or plural. The character "/" usually indicates an "or" relationship between the associated objects. "At least one of the following items (pieces)" or a similar expression thereof means any combination of these items, including any combination of singular items (pieces) or plural items (pieces). Unless otherwise stated, ordinal numbers such as "first" and "second" in embodiments of this application are used to distinguish between a plurality of objects, and are not intended to limit sizes, content, an order, a time sequence, priorities, importance degrees, or the like of the plurality of objects.

A device control method provided in embodiments of this application is applicable to a communication system including a first electronic device and a second electronic device. The first electronic device may be connected to the second electronic device, and control the second electronic device. For example, the first electronic device may be a portable device with a display, like a mobile phone, a tablet computer, a watch, or a band. The second electronic device may be a smart household appliance device like a television, a refrigerator, or a speaker, or may be an office device like a projector or a printer. The second electronic device and the first electronic device may be devices of a same type or devices of different types. This is not limited in embodiments of this application. For ease of description, the following provides description by using an example in which the first electronic device is a mobile phone and the second electronic device is a television.

For example, FIG. 1A-1 to FIG. 1B-2 are schematic diagrams of an application scenario according to an embodiment of this application.

Figures 1, 1A, 2:
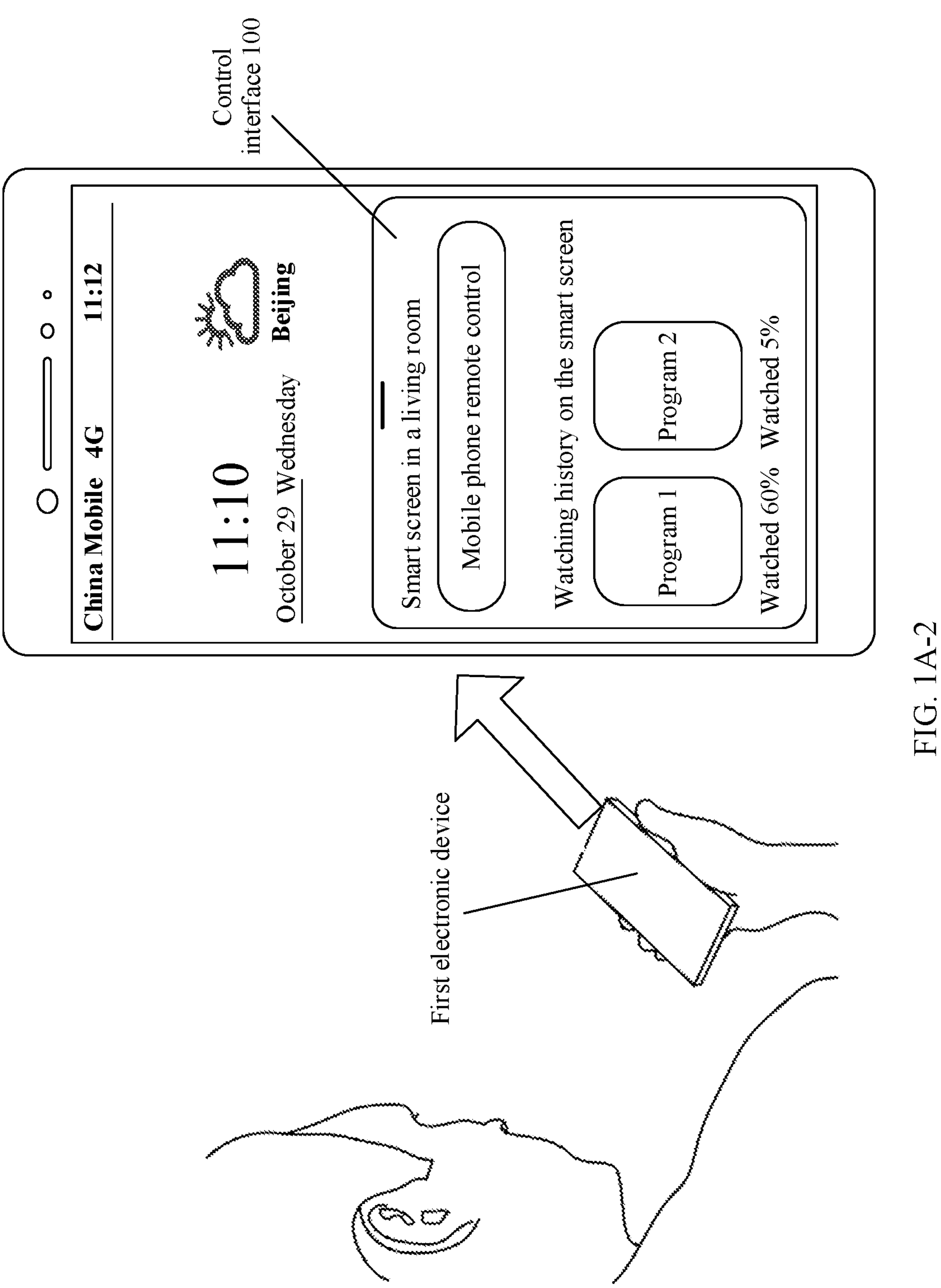
Figures 1, 1B:
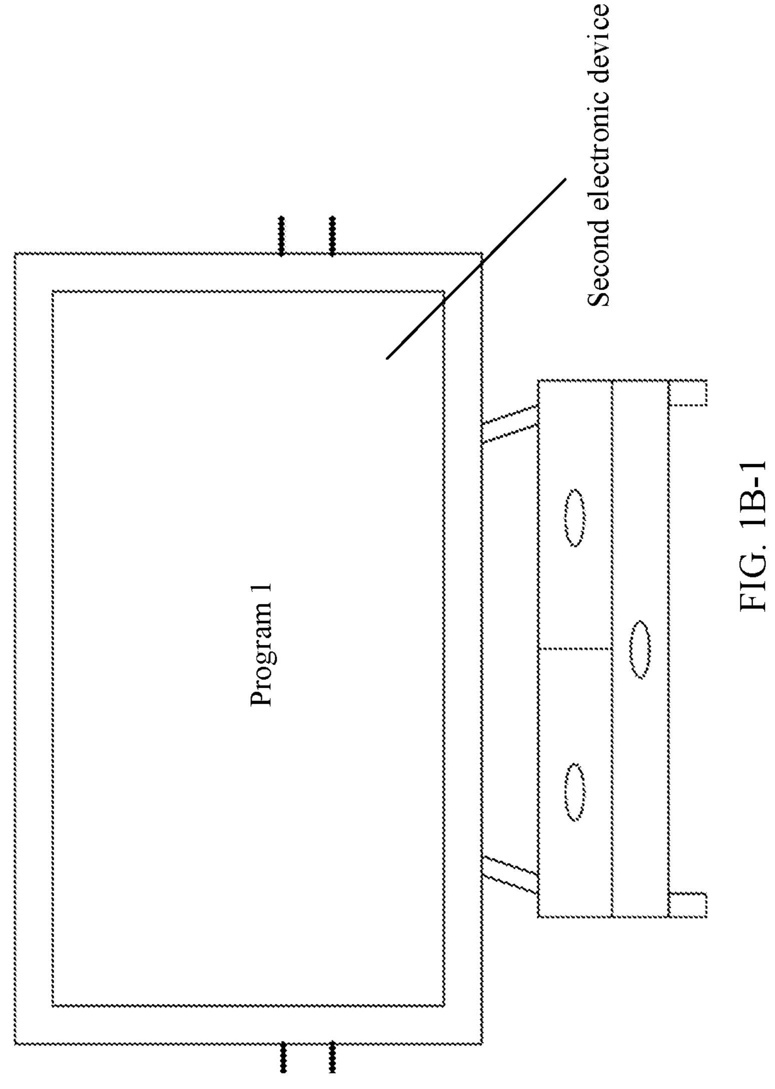
Figures 1, 1B, 2:
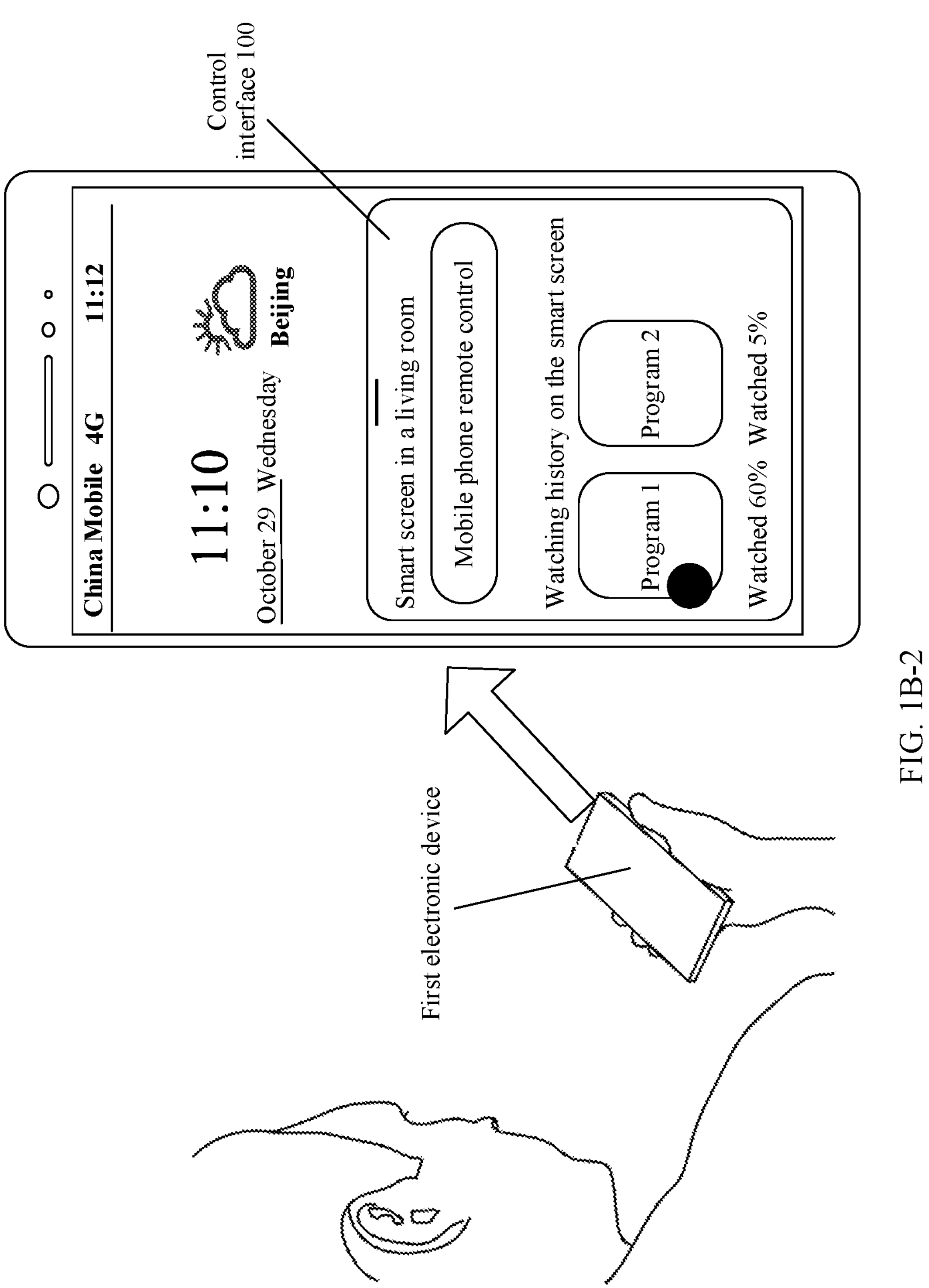
Figure 2:
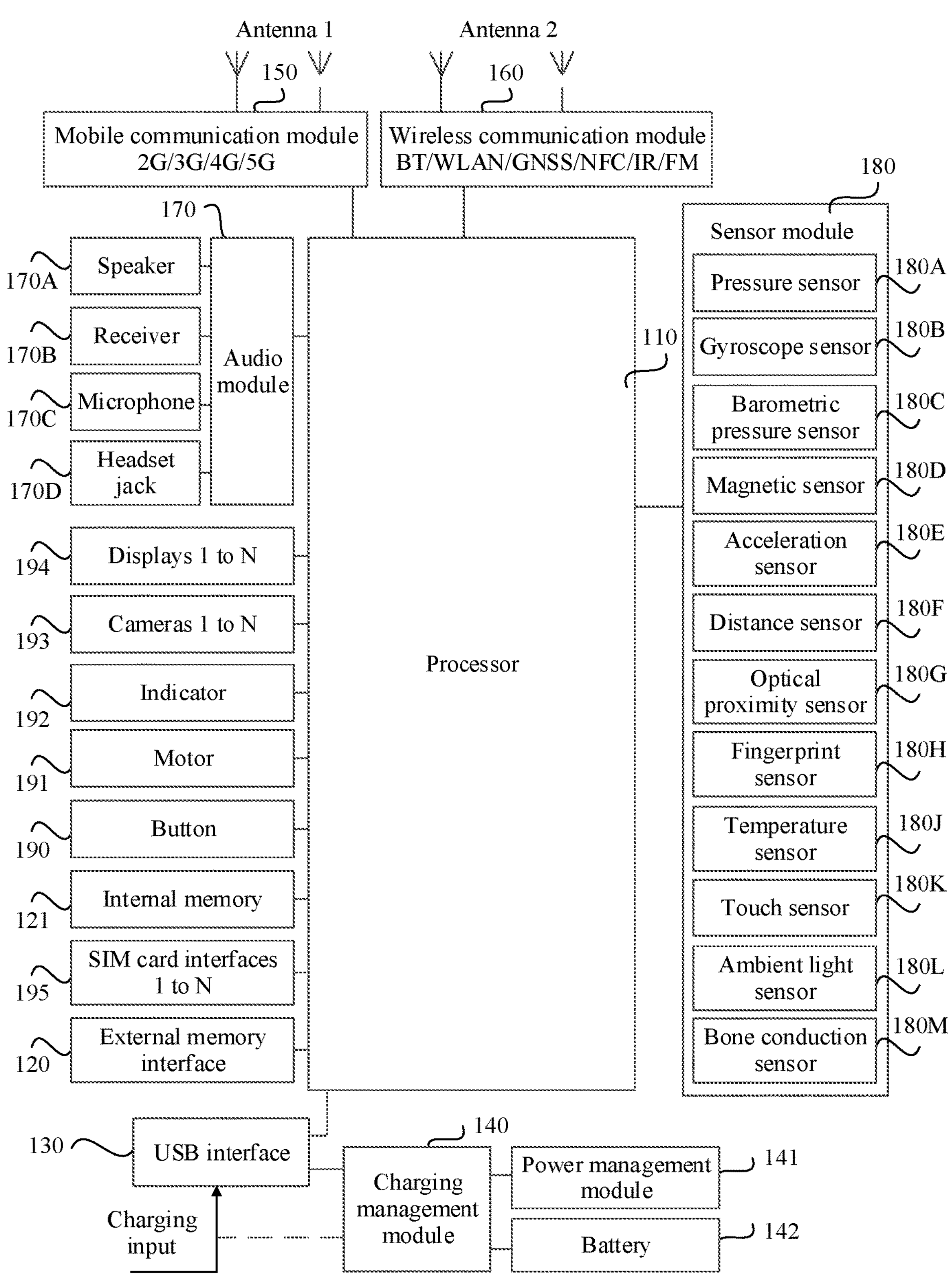

As shown in FIG. 1A-1, the second electronic device (for example, the television) displays a main interface. When detecting a preset gesture operation, the first electronic device (for example, the mobile phone) establishes a connection to the second electronic device, and obtains related information (for example, a historical watching record of the second electronic device) of the second electronic device (for example, the television). Then, the first electronic device displays a control interface 100, where the control interface 100 includes the related information of the second electronic device. A user may control the second electronic device through the control interface 100. For example, as shown in FIG. 1B-2, it is assumed that the user may select, on the control interface 100, a program 1 that has been historically watched on the second electronic device. The first electronic device may control the second electronic device to start the program 1.

For example, in an embodiment of this application, when the user wants to remotely control the second electronic device, the user may perform the preset gesture operation on the first electronic device, to invoke, on the first electronic device, the control interface that can be for controlling the second electronic device, and the user does not need to search for, on the first electronic device through eyes, an application for remotely controlling the second electronic device, and then start the application to control the second electronic device. In this way, an operation is convenient.

The following describes an electronic device related to embodiments of this application.

For example, FIG. 2 is a schematic diagram of a hardware structure of an electronic device according to an embodiment of this application. The electronic device may be the first electronic device or the second electronic device. As shown in FIG. 2, the electronic device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (neuraNPU), and/or the like. Different processing units may be independent components, or may be integrated into one or more processors. The controller may be a nerve center and a command center of the electronic device. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, to improve system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the electronic device, or may be configured to perform data transmission between the electronic device and a peripheral device. The charging management module 140 is configured to receive a charging input from a charger. The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, and the like.

A wireless communication function of the electronic device may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution, applied to the electronic device, to wireless communication including 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules in the processor 110 may be disposed in a same device.

The wireless communication module 160 may provide a solution, applied to the electronic device, to wireless communication including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The display 194 is configured to display a display interface of an application, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device may include one or N displays 194, where N is a positive integer greater than 1.

The camera 193 is configured to capture a static image or a video. The camera 193 may include a front-facing camera and a rear-facing camera.

The internal memory 121 may be configured to store computer-executable program code. The executable program code includes instructions. The processor 110 runs the instructions stored in the internal memory 121, to perform various function applications and data processing of the electronic device. The internal memory 121 may include a program storage area and a data storage area. The program storage area may store an operating system, software code of at least one application (for example, an iQIYI application or a WeChat application), and the like. The data storage area may store data (for example, an image or a video) generated in a process of using the electronic device, and the like. In addition, the internal memory 121 may include a high-speed random access memory, and may further include a non-volatile memory, for example, at least one magnetic disk storage device, a flash memory, or a universal flash storage (universal flash storage, UFS).

The external memory interface 120 may be configured to connect to an external memory card, for example, a micro SD card, to extend a storage capability of the electronic device. The external memory card communicates with the processor 110 through the external memory interface 120, to implement a data storage function. For example, files such as pictures or videos are stored in the external memory card.

The electronic device may implement an audio function, for example, music playing or recording, through the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed on the display 194. The gyroscope sensor 180B may be configured to determine a motion posture of the electronic device. In some embodiments, angular velocities of the electronic device around three axes (namely, x, y, and z axes) may be determined by using the gyroscope sensor 180B.

The gyroscope sensor 180B may be configured to implement image stabilization during photographing. The barometric pressure sensor 180C is configured to measure barometric pressure. In some embodiments, the electronic device calculates an altitude based on a barometric pressure value measured by the barometric pressure sensor 180C, to assist in positioning and navigation. The magnetic sensor 180D includes a Hall sensor. The electronic device may detect opening and closing of a flip leather case by using the magnetic sensor 180D. In some embodiments, when the electronic device is a clamshell phone, the electronic device may detect opening and closing of a flip cover based on the magnetic sensor 180D. Further, a feature like automatic unlocking of the flip cover is set based on a detected open or closed state of the leather case or the flip cover. The acceleration sensor 180E may detect accelerations of the electronic device in various directions (usually on three axes). When the electronic device is still, a magnitude and a direction of gravity may be detected. The acceleration sensor 180E may be further configured to identify a posture of the electronic device, and is used in applications like switching between a landscape mode and a portrait mode, a pedometer, and the like.

The distance sensor 180F is configured to measure a distance. The electronic device may measure the distance through infrared or laser. In some embodiments, in a photographing scenario, the electronic device may measure a distance through the distance sensor 180F to implement quick focusing. The optical proximity sensor 180G may include, for example, a light-emitting diode (LED), and an optical detector like a photodiode. The light emitting diode may be an infrared light emitting diode. The electronic device emits infrared light by using the light-emitting diode. The electronic device detects infrared reflected light from a nearby object by using the photodiode. When sufficient reflected light is detected, the electronic device may determine that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device is in a pocket, to avoid an accidental touch. The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device lowers performance of a processor located near the temperature sensor 180J, to reduce power consumption for thermal protection. In some other embodiments, when the temperature is less than another threshold, the electronic device heats the battery 142, to prevent the electronic device from being shut down abnormally due to a low temperature. In some other embodiments, when the temperature is less than still another threshold, the electronic device boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of a touch event. The display 194 may provide a visual output related to the touch operation. In some other embodiments, the touch sensor 180K may alternatively be disposed on a surface of the electronic device, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse, to receive a blood pressure beating signal.

The button 190 includes a power button, a volume button, and the like. The button 190 may be a mechanical button, or may be a touch button. The electronic device may receive a button input, and generate a button signal input related to user settings and function control of the electronic device. The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device.

It may be understood that the components shown in FIG. 2 constitute no specific limitation on the electronic device. The electronic device in embodiments of the present invention may include more or fewer components than those in FIG. 2. In addition, a combination/connection relationship between the components in FIG. 2 may also be adjusted and modified. It should be noted that structures of the first electronic device and the second electronic device may be the same or different. For example, both are the structure shown in FIG. 2; or the first electronic device includes some components shown in FIG. 2, the second electronic device includes some components shown in FIG. 2, and the components included in the first electronic device and the second electronic device may completely or partially overlap. This is not limited in embodiments of this application.

Figure 3:
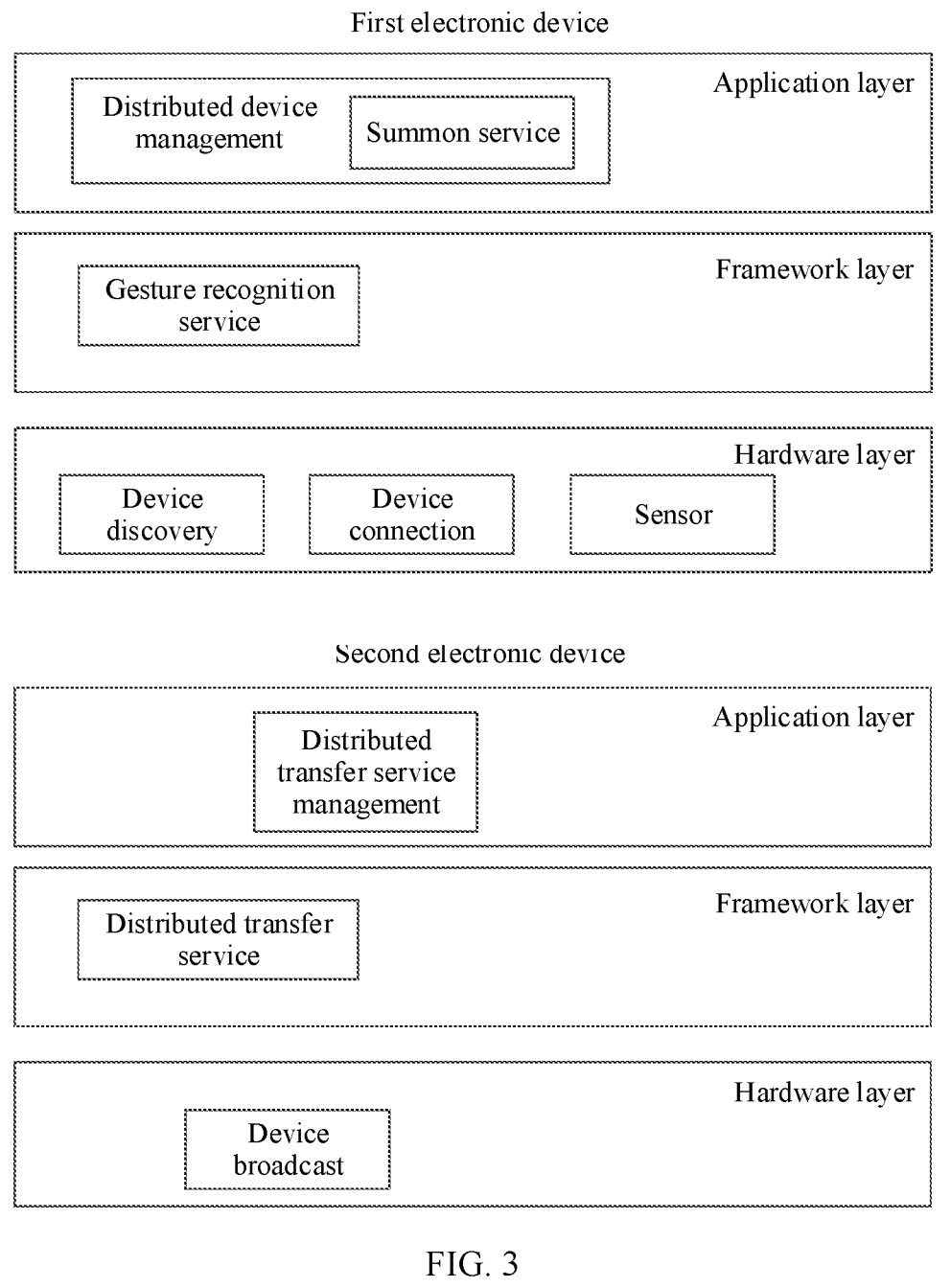

FIG. 3 is a block diagram of a software structure of an electronic device according to an embodiment of this application. As shown in FIG. 3, an upper part is a block diagram of a software structure of the first electronic device, and a lower part is a block diagram of a software structure of the second electronic device.

The software structure of the first electronic device may be a layered architecture. For example, software may be divided into several layers, and each layer has a clear role and task. The layers communicate with each other through a software interface. It is assumed that the first electronic device runs an Android system. The software structure of the first electronic device may include an application layer, an application framework (FWK) layer, a hardware layer, and the like. The application layer may include a series of application packages, for example, may include Camera, Settings, a user interface (UI), a third-party application, and the like, and may further include a distributed device management application. The distributed device management application is used for managing a device (for example, the second electronic device) connected to the first electronic device. For example, the distributed device management application may be a Huawei AI Life application. The distributed device management application includes a Summon service. The Summon service includes: when a preset gesture operation (for example, a Summon gesture operation) is recognized, being connected to the second electronic device, obtaining related information of the second electronic device, and then displaying a control interface through a display to control a function of the second electronic device. The framework layer includes a gesture recognition service for recognizing whether a gesture operation is the preset gesture operation (the preset gesture operation is described below). The hardware layer includes device discovery for discovering a surrounding device; and further includes a device connection for establishing a connection to the surrounding device. Certainly, the hardware layer may further include other components such as a sensor and a display.

For example, a working procedure of the first electronic device is described below by using the software structure of the first electronic device shown in FIG. 3 as an example.

The sensor at the hardware layer collects sensor data (for example, parameters such as an angular velocity and an angle that are obtained when the mobile phone is swung). The hardware layer reports the sensor data to the gesture recognition service at the framework layer, and the gesture recognition service recognizes, based on the sensor data, whether a gesture operation is the preset gesture operation. If the preset gesture operation is recognized, the framework layer sends indication information to the Summon service at the application layer, to indicate that a user triggers the preset gesture operation. In this case, the Summon service determines that the user intends to remotely control the surrounding device. Therefore, the application layer invokes the device discovery at the hardware layer to discover the surrounding device. The application layer (for example, the Summon service at the application layer) determines the second electronic device from the discovered surrounding device, then invokes the device connection at the hardware layer to establish a connection to the second electronic device, and receives first information (which is described below) returned by the second electronic device. The application layer invokes the display (not shown in the figure) at the hardware layer to display the control interface. The control interface may include the first information returned by the second electronic device, and the control interface may be for controlling the second electronic device.

Still as shown in FIG. 3, the software structure of the second electronic device may also be a layered structure, for example, may include an application layer, a framework layer, and a hardware layer. The application layer includes various applications on the second electronic device, and may further include distributed transfer service management for managing an application and/or a function that support/supports a distributed transfer service on the second electronic device. For example, the distributed transfer service management may be a functional module in an application. The application may be, for example, a Huawei AI Life application. The framework layer includes a distributed transfer service for detecting whether an application and/or a function support/supports the distributed transfer service. The hardware layer includes a device broadcast for broadcasting device information. Certainly, the hardware layer may further include a hardware connection, hardware discovery, a display, and the like.

The distributed transfer service may be understood as that an application or an application interface (all or some interfaces), or a function or a function interface (all or some interfaces) can be transferred from one device to another device. The transfer may be that related data or information of the application interface or the function interface is transferred to the another device, and the data or information may be for displaying the interface on the another device or implementing a function or logic corresponding to the interface.

Therefore, that a device supports the distributed transfer service means that an application or an application interface, or a function or a function interface on the device can be transferred from the device to another device. A television is used as an example. An interface of an application in the television may be transferred to the mobile phone, the mobile phone displays the interface or an interface similar to the interface, and the user may control the television on the mobile phone through the interface.

In some embodiments, a device supporting the distributed transfer service may have a general-purpose control interface. The interface is specially used by the device for transferring to another device, may be specified by the user, may be set when the device is delivered, may be a main interface, or the like. The general-purpose control interface can be for controlling the entire device. For example, the general-purpose control interface includes a power-on button, a power-off button, a volume control button, a display brightness control button, a playing history record, and the like of the device, and is specifically described below.

In some other embodiments, different applications and/or functions supporting the distributed transfer service on a device may have a personalized control interface (an application control interface for short). The personalized control interface may be designed during application development, or may be a home page of an application, or may be specified by the user. For example, a device includes an application A and an application B. Both the application A and the application B support the distributed transfer service. The application A has an application control interface A for controlling the application A, and the application B has an application control interface B for controlling the application B. The application control interface A or the application control interface B is specially used for transferring to another device. For example, when a foreground of the device is displaying the application A, the application control interface A is transferred to the another device; or when a foreground of the device is displaying the application B, the application control interface B is transferred to the another device.

Therefore, an interface transferred from one device to another device may be the general-purpose control interface or the application control interface. For example, when a foreground of the device is displaying the application A, the application control interface A is transferred; or when a foreground of the device is displaying the application B, the application control interface B is transferred; or when a foreground of the device is displaying the main interface, the general-purpose control interface is transferred. It may be understood that the device may further include an application that does not support the distributed transfer service, for example, may include an application C. The application C does not support the distributed transfer service. Because the application C does not have a corresponding application control interface, when the foreground of the device is displaying the application C, the general-purpose application control interface may be transferred.

For example, a working procedure of the second electronic device is described below by using the software structure of the second electronic device shown in FIG. 3 as an example.

Figures 4, 5:
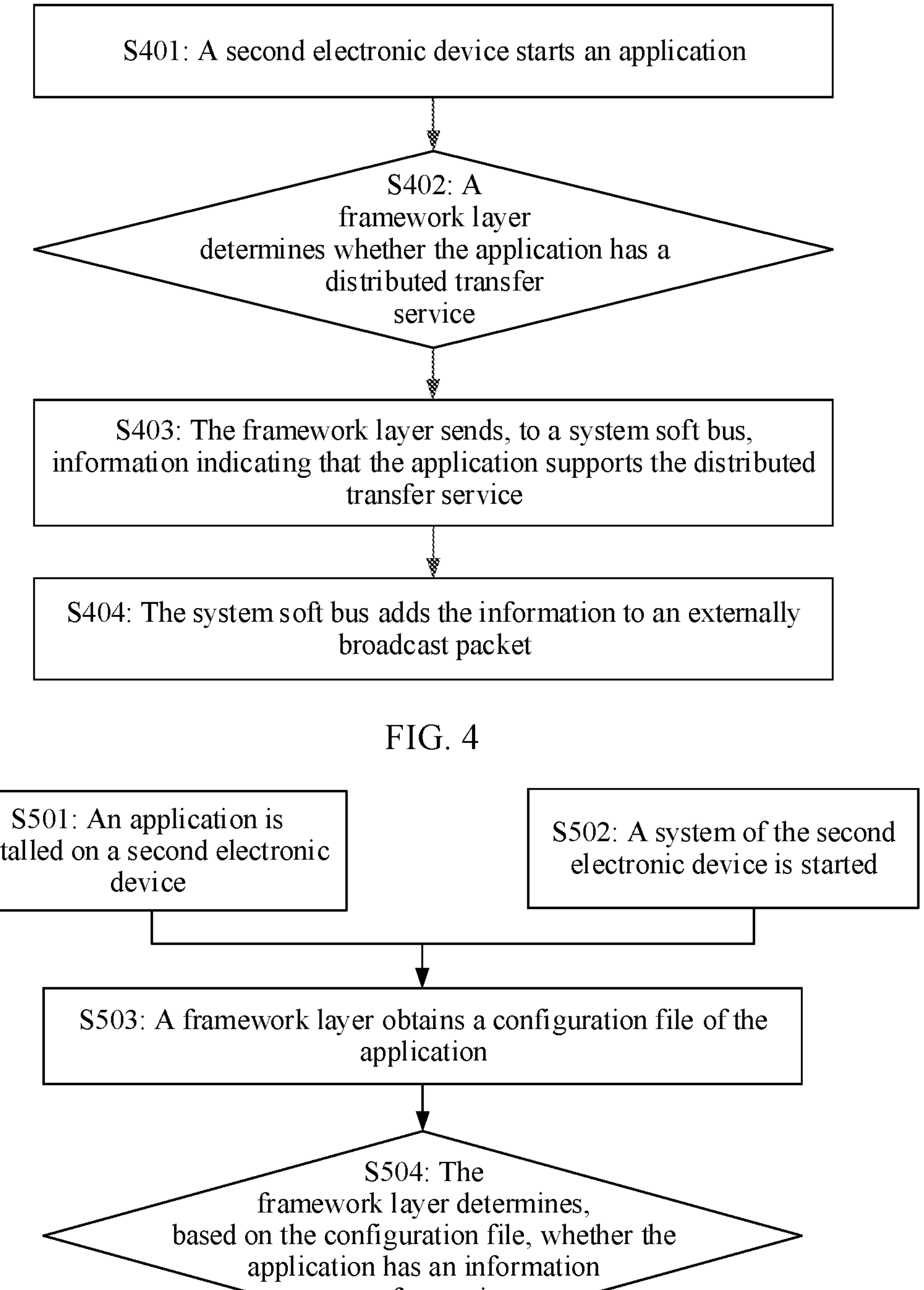
FIG. 4 and FIG. 5 each are a schematic diagram of a processing procedure of a software structure of a second electronic device according to an embodiment of this application.

As shown in FIG. 4, when the second electronic device starts an application (S401), the framework layer (for example, the distributed transfer service at the framework layer) determines whether the application supports the distributed transfer service (S402). If the application supports the distributed transfer service, the framework layer may send, to a system soft bus (S403), information indicating that the application supports the distributed transfer service. The system soft bus includes a system service that has functions such as discovering a device and implementing networking, and may provide a more universal capability for an upper-layer service according to different wired and wireless communication protocols and manners. It may be understood that, the system soft bus in this application may also be replaced with another service or module that can complete a technical feature in this application. The system soft bus may add the information to an externally broadcast packet (S404). In this way, the second electronic device may externally broadcast the application having the distributed transfer service. For example, the externally broadcast packet of the system soft bus may include information such as a name, a version number, a supported control type (a remote control handle, VR control, AR control, or the like) of the application, and a model and a version of the second electronic device. When the application stops running, the framework layer notifies the system soft bus of information indicating that the application stops running, and the system soft bus deletes, from the externally broadcast packet, the information indicating that the application supports the distributed transfer service.

There are a plurality of manners in which the framework layer determines whether the application has the distributed transfer service in S402. For example, the framework layer obtains a configuration file of the application. If the configuration file includes a declaration that the application supports the distributed transfer service, the framework layer determines that the application has the distributed stream transfer service; or if the configuration file does not include a declaration that the application supports the distributed transfer service, the framework layer determines that the application does not have the distributed transfer service. The configuration file may be, for example, a Manifest.xml file. For another example, the framework layer reports the information about the application to the distributed transfer service management module at the application layer. The information about the application includes at least one of a name of an application package, a name, an application version number, a control type, and the like. The distributed transfer service management module collects statistics on a list of applications having the distributed transfer service on the second electronic device. The distributed transfer service management module determines whether the application reported by the framework layer exists in the application list. If the application reported by the framework layer exists in the application list, it is determined that the application has the distributed transfer service; or if the application reported by the framework layer does not exist in the application list, it is determined that the application does not have the distributed transfer service.

A process in which the distributed transfer service management module at the application layer collects statistics on the application having the distributed transfer service on the second electronic device is described below.

For example, as shown in FIG. 5, when an application is installed on the second electronic device (S501), the framework layer (for example, the distributed transfer service at the framework layer) in the second electronic device obtains a configuration file (S503) of the application, and determines, by using the configuration file, whether the application supports the transfer service (S504). If the application supports the transfer service, the framework layer reports information about the application to the transfer service management module at the application layer for unified management (S505). The information about the application includes at least one of a name of an application package, a name, an application version number, an application having an information transfer function, a control type, and the like. Therefore, each time an application having the distributed transfer service is installed, the transfer service management module at the application layer may collect statistics on the installed application. Alternatively, still as shown in FIG. 5, when a system of the second electronic device is started (S502), the distributed transfer service at the framework layer may obtain the configuration file of the application on the second electronic device (S503), determine, based on the configuration file, an application supporting the distributed transfer service (S504), and report, to the distributed transfer service management module at the application layer for unified management, the application supporting the distributed transfer service (S505). Therefore, each time after the system is started, the distributed transfer service management module at the application layer may collect statistics on the application having the distributed transfer service on the second electronic device once.

In the following embodiments, a device control method provided in embodiments of this application is described in detail with reference to the accompanying drawings.

Figure 6:
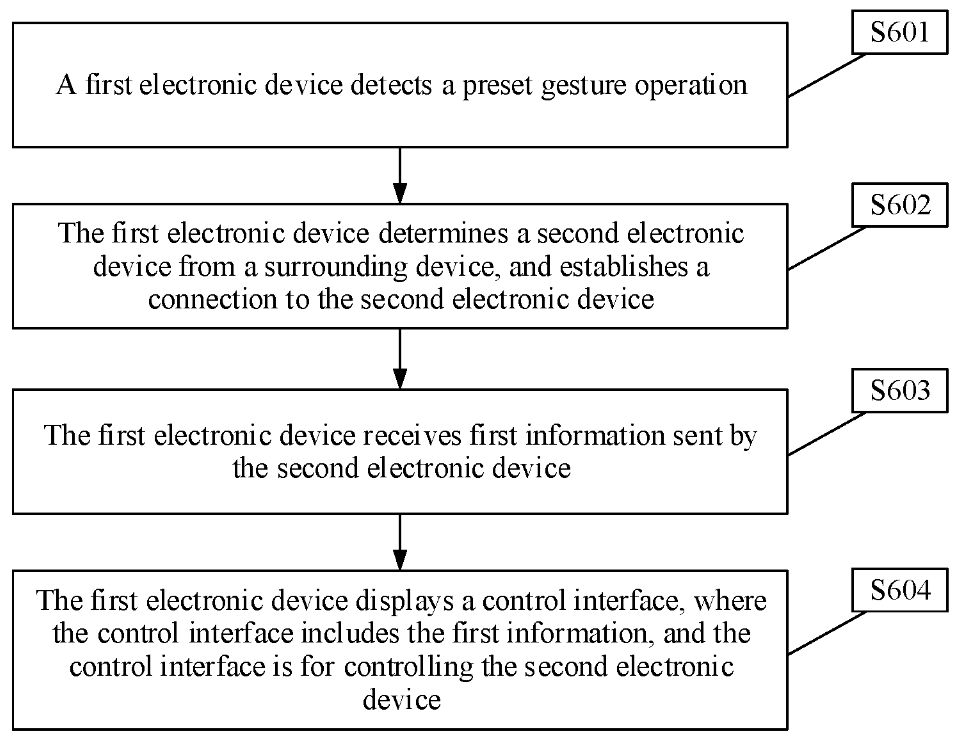
FIG. 6 is a schematic flowchart of a device control method according to an embodiment of this application.

FIG. 6 is a schematic flowchart of a device control method according to an embodiment of this application. The method is applicable to a first electronic device. As shown in FIG. 6, a procedure of the method includes the following steps.

S601: The first electronic device detects a preset gesture operation.

Figure 7:
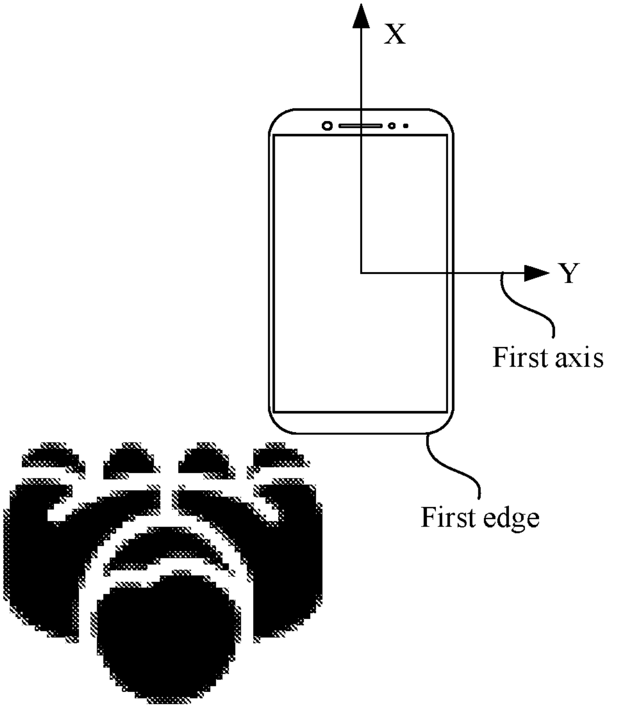
FIG. 7 and FIG. 8 are schematic diagrams of a preset gesture operation according to an embodiment of this application.
Figure 8:
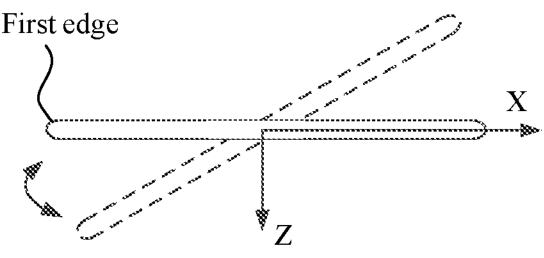

The preset gesture operation may be a swing operation of a first edge of the first electronic device by using a first axis as a rotation axis. The first edge is an edge that is of the first electronic device and that is close to a user when the user holds the first electronic device. For example, as shown in FIG. 7, an example in which the first electronic device is a mobile phone is used. When the user holds the mobile phone, a bottom edge of the mobile phone is close to the user. Therefore, the first edge is the bottom edge of the mobile phone. The first axis passes through the central point of the first electronic device and is parallel to the first edge. For example, still as shown in FIG. 7, a coordinate system is established according to a right-hand law by using a long edge of the mobile phone as an X-axis and a short edge as a Y-axis. In this case, the first axis is the Y-axis. For ease of understanding, as shown in FIG. 8, from a perspective of the long edge of the mobile phone, the first edge (namely, the bottom edge close to the user) of the mobile phone is swung around the Y-axis (for example, swung up and down).

It may be understood that S601 may specifically include: The first electronic device detects a gesture operation, and determines whether the gesture operation is the preset gesture operation. For example, when the gesture operation meets at least one of the following conditions, the first electronic device determines that the gesture operation is the preset gesture operation. The conditions include the following conditions.

1. A swing angle at which the first edge of the first electronic device is swung by using the first axis as the rotation axis falls within a preset angle range. For example, the preset angle range is 30 degrees to 60 degrees. A specific value is not limited in this application.
2. A swing angular velocity at which the first edge of the first electronic device is swung by using the first axis as the rotation axis falls within a preset angular velocity range.
3. A quantity of swing times for which the first edge of the first electronic device is swung within preset duration by using the first axis as the rotation axis is greater than a preset quantity of times. Specific values of the preset duration, the preset quantity of times, and the like are not limited in embodiments of this application.
4. A time interval at which the first edge of the first electronic device is continuously swung twice by using the first axis as the rotation axis is less than a preset time interval. A specific value of the preset time interval is not limited in embodiments of this application.
5. A tilt angle of the first edge in a horizontal direction is less than a preset angle when the first edge of the first electronic device is swung by using the first axis as the rotation axis. FIG. 7 is still used as an example. The first edge is the bottom edge of the mobile phone. When the user holds the mobile phone, the bottom edge of the mobile phone is not necessarily in a horizontal state, and may tilt. In this case, it is considered normal that the tilt angle is less than the preset angle.

S602: The first electronic device determines a second electronic device from a surrounding device in response to the preset gesture operation, and establishes a connection to the second electronic device.

There are a plurality of manners in which the first electronic device determines the second electronic device from the surrounding device, and the manners include but are not limited to at least one of the following Manners 1 to 4.

Manner 1: The first electronic device determines that a device supporting a distributed transfer service in the surrounding device is the second electronic device.

That the second electronic device supports a distributed transfer service means that an application or an application interface, or a function or a function interface on the second electronic device may be transferred from the second electronic device to another device.

For example, in an embodiment, the electronic device supporting the distributed transfer service broadcasts information in real time. The information may carry indication information indicating that the electronic device supports the distributed transfer service, and the indication information may be a distributed transfer service identifier. When receiving broadcast information from a device, and determining that the broadcast information carries a distributed transfer service identifier, the first electronic device determines that the device is the second electronic device. In another possible implementation, the first electronic device initiates a query request, where the query request is for requesting to query whether a receive end supports the distributed transfer service. After receiving the query request, a device supporting the distributed transfer service returns information (optionally, the information may carry indication information indicating that the device supports the distributed transfer service, and the indication information may be a distributed transfer service identifier) to the first electronic device. A device that does not have the distributed transfer service may make no response after receiving the query request. Therefore, if the first electronic device receives a signal that is returned by a device based on the query request, the first electronic device determines that the device is the second electronic device.

Manner 2: The first electronic device determines that a device that is in the surrounding device and that is located within a preset orientation range of the first electronic device is the second electronic device.

Figure 9:
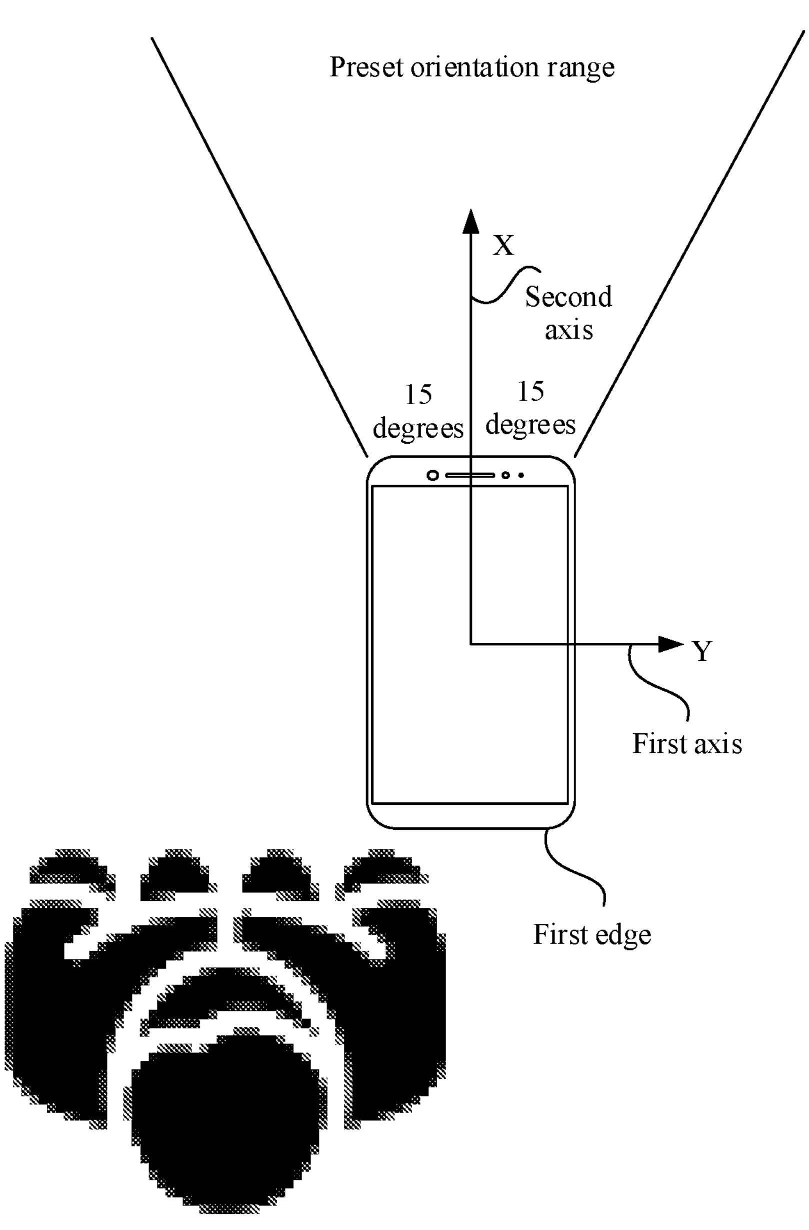
FIG. 9 is a schematic diagram of a preset orientation range according to an embodiment of this application.

The preset orientation range includes a preset angle range that uses a direction of a second axis on the first electronic device as a center. The second axis passes through the central point of the first electronic device and is perpendicular to the first edge, and the first edge is an edge that is of the first electronic device and that is close to the user when the user holds the first electronic device. For example, as shown in FIG. 9, the first edge is the bottom edge of the mobile phone, and the second axis is the X-axis. The preset orientation range includes a specific angle range that uses the X-axis of the first electronic device as the center. For example, the preset orientation range is an interval [a, b]. Herein, a is a direction obtained by offsetting an angle threshold 1 (for example, 15 degrees) clockwise in an X-axis direction, and b is a direction obtained by offsetting an angle threshold 2 (for example, 15 degrees) counterclockwise in the X-axis direction. It may be understood that the first electronic device may determine the X-axis direction in real time, and then obtains the preset angle range through calculation based on the direction of the X-axis, the angle threshold 1, and the angle threshold 2. The first electronic device determines that the device that is in the surrounding device and that is located within the preset orientation range is the second electronic device. A specific implementation includes at least one of the following Manners A and B.

Manner A: The first electronic device may send a directional signal, where a sending direction of the directional signal falls within the preset orientation range. A device within the preset orientation range receives the directional signal from the first electronic device, and a device beyond the preset orientation range does not receive the directional signal from the first electronic device. In this way, when receiving a signal that is returned by a device based on the directional signal, the first electronic device may determine that the device is located within the orientation range, and further determine that the device is the second electronic device. The first electronic device may send the directional signal based on at least one of an ultrasonic technology, a UWB technology, a Bluetooth technology, and the like. This is not limited in embodiments of this application.

It may be understood that, when the user performs the preset gesture operation, a posture of the first electronic device varies. Correspondingly, the preset orientation range of the first electronic device varies. Therefore, before sending the directional signal, the first electronic device may further determine a sending direction of the signal. For example, a manner of determining the sending direction of the signal includes but is not limited to at least one of the following manners.

1. Determine that a preset orientation range within which the preset gesture operation ends and the first electronic device is still (or still preset duration) is the sending direction of the signal. To be specific, when detecting that the preset gesture operation ends and the first electronic device is still, the first electronic device sends the directional signal to a device within the preset orientation range of the first electronic device when being still.

2. Determine that an average value of an orientation range of the first electronic device in a process of performing the preset gesture operation is the sending direction of the signal. For example, FIG. 9 is used as an example. In a process of swinging the first edge around the Y-axis, a posture of the mobile phone may vary, and an average orientation range of the first electronic device in a swing process may be determined. The average orientation range is the sending direction of the signal.

Manner B: The first electronic device calculates a direction of the surrounding device according to a positioning algorithm, and determines, based on the direction of the surrounding device, the second electronic device located within the preset orientation range of the first electronic device. In this manner, the first electronic device may not have a function of sending the directional signal. For example, the first electronic device broadcasts a signal in each direction. After receiving the signal, the receive end returns the signal to the first electronic device. The first electronic device may calculate a direction of the receive end based on the returned signal, and then determine, based on the direction, whether the receive end is located within the preset orientation range of the first electronic device. The positioning algorithm includes at least one of a microphone array positioning technology, a high-resolution spectrum analysis-based directional method, a time-delay estimation (TDE)-based directional method, and the like. This is not limited in embodiments of this application.

The following uses the microphone array positioning technology as an example to describe a process in which the first electronic device locates the direction of the surrounding device.

Figure 10:
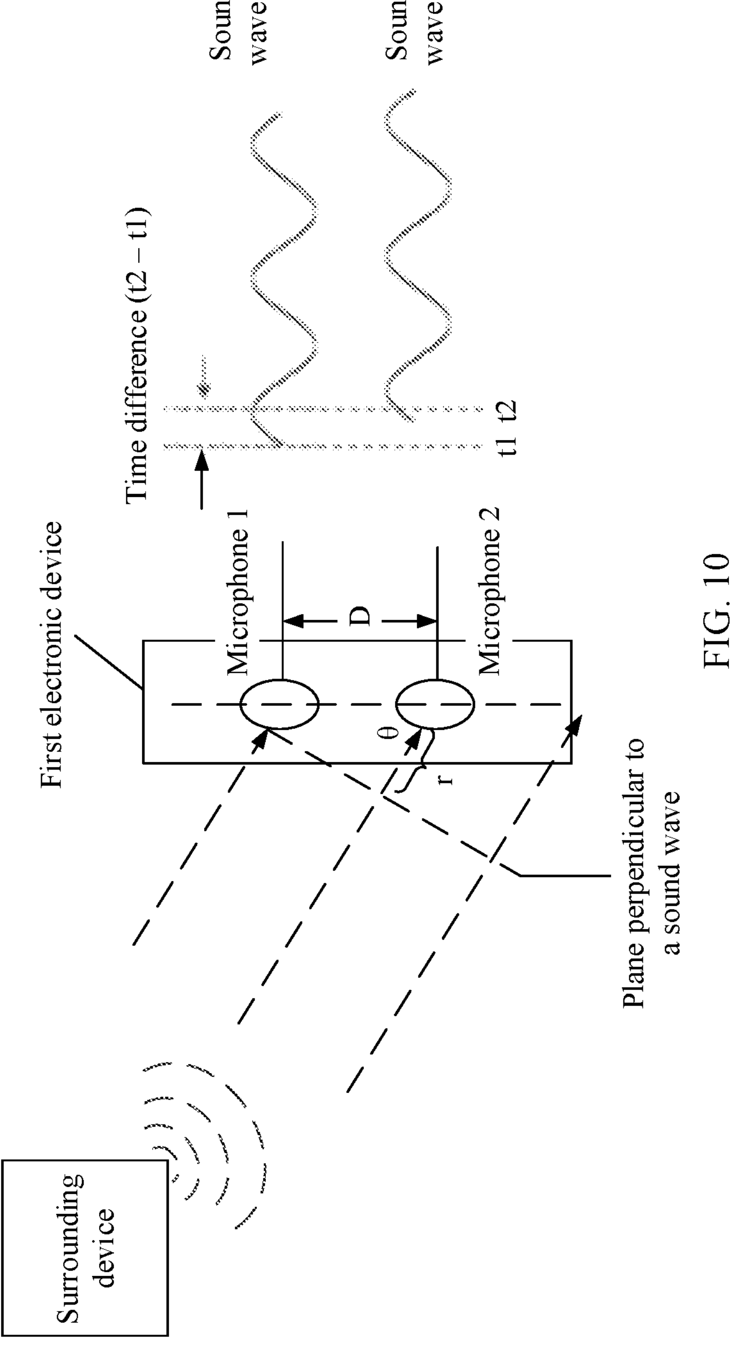
FIG. 10 is a schematic diagram of locating a direction of a surrounding device on a first electronic device according to an embodiment of this application.

A microphone array is disposed in the first electronic device. The microphone array may be understood as a plurality of microphones distributed according to a specific rule (for example, three rows and three columns or five rows and five columns). For example, a sound wave emitted by the surrounding device is a parallel wave. As shown in FIG. 10, in the first electronic device, a microphone 1 receives a sound wave 1 at a moment t1, and a microphone 2 receives a sound wave 2 at a moment t2. In this case, a time difference between the sound wave 1 and the sound wave 2 is t2–t1. For the time difference, refer to FIG. 9. Because the sound wave emitted by the surrounding device is the parallel wave, time for the parallel wave to reach a perpendicular plane (a plane perpendicular to the sound wave) should be the same. For the perpendicular plane, refer to FIG. 9. Therefore, a difference between distances from the parallel wave to the microphone 1 and the microphone 2 is r=(t2–t1)×c. Herein, t1 and t2 are known quantities, a sound propagation speed c is a known quantity, and a distance D (where the distance D may be stored by default before delivery) between the microphone 1 and the microphone 2 is a known quantity. Therefore, as shown in FIG. 9, an included angle θ may be determined by using the known quantities t1, t2, c, and D. For example, the included angle θ meets the following formula:

$$\cos\theta = \frac{(t2 - t1)\times c}{D}$$

According to the formula, a value of the included angle θ may be obtained, and the included angle θ indicates the direction of the surrounding device.

In some other embodiments, a process of calculating the direction of the surrounding device in Manner B may be completely performed by the first electronic device, or may be performed by the first electronic device with assistance of the surrounding device. For example, the microphone array positioning technology may also be used in the surrounding device. After the surrounding device receives the signal broadcast by the first electronic device, the surrounding device may obtain a direction of the first electronic device through calculation based on the microphone array positioning technology, and then the surrounding device returns the signal to the first electronic device. The signal carries the direction obtained by the surrounding device through calculation, to assist the first electronic device in positioning.

Optionally, the first electronic device may further determine a distance between the surrounding device and the first electronic device, and determine that a device whose distance from the first electronic device is greater than a preset distance is the second electronic device.

Manner 3: The first electronic device determines that a trusted device in the surrounding device is the second electronic device.

The trusted device of the first electronic device meets at least one of the following: logging in to a same account as the first electronic device, being connected to a same local area network as the first electronic device, having been connected to or interacted with the first electronic device, and being located within a same geographic area as the first electronic device.

For example, the first electronic device is a mobile phone, and the second electronic device is a television. The mobile phone is used to log in to a Huawei system account of a user. When determining that a login account of the television is the Huawei system account, the mobile phone determines that the television is the trusted device of the mobile phone. Alternatively, the mobile phone accesses Wi-Fi at home. When determining that the television is also connected to Wi-Fi at home, the mobile phone determines that the television is the trusted device of the mobile phone. Alternatively, the mobile phone stores a list of devices that have been connected to the mobile phone. After discovering the surrounding device, the mobile phone determines that a device that is in the surrounding device and that exists in the device list is the trusted device.

Manner 4: The first electronic device determines, based on a user operation, that a user-specified device is the second electronic device.

For example, the first electronic device displays a device list, where the device list includes the surrounding device of the first electronic device, and the user may select the second electronic device from the device list.

The first electronic device may use any one of Manner 1 to Manner 4, or may use a combination of a plurality of manners. The following provides description by using a combination of a plurality of manners as an example.

For example, the first electronic device may first identify a trusted device and an untrusted device in the surrounding device, and preferentially select the second electronic device from the trusted device. It may be understood that there are a plurality of cases. In a first case, there is only the trusted device in the surrounding device. In a second case, there are both the trusted device and the untrusted device in the surrounding device. In a third case, there is only the untrusted device in the surrounding device.

In the first case, there is only the trusted device in the surrounding device.

If there is only one trusted device, the first electronic device may directly establish a connection to the trusted device. If there are a plurality of trusted devices, the first electronic device may select an optimal device to establish a connection. The optimal device selected from the plurality of trusted devices meets at least one of the following: a device supporting the distributed transfer service, a device located within a preset orientation range of the first electronic device, a device at an optimal angle within the preset orientation range (for example, in the X-axis direction of the first electronic device), a device currently in a power-on state, a device closest to the user, a device selected by the user from the device list (including device identifiers of the plurality of trusted devices), and the like.

In the second case, there are both the trusted device and the untrusted device in the surrounding device.

The first electronic device may establish a connection to the trusted device. If there is only one trusted device, the first electronic device may directly establish a connection to the trusted device. If there are a plurality of trusted devices, the first electronic device may select an optimal device to establish a connection. For a manner of selecting the optimal device from the plurality of trusted devices, refer to the foregoing description.

For example, when there are a plurality of trusted devices, the first electronic device may determine whether there is a trusted device located within the preset orientation range of the first electronic device. If there is one trusted device located within the preset orientation range, the first electronic device establishes a connection to the trusted device. If there are a plurality of trusted devices located within the preset direction range, the first electronic device may select an optimal device to establish a connection. A manner of selecting the optimal device includes at least one of the following: a device having the distributed transfer service, a device at an optimal angle within the preset orientation range, a device currently in a power-on state, a device closest to the user, a device selected by the user from the device list, and the like. If there is no trusted device located within the preset orientation range of the first electronic device, the first electronic device may select a trusted device that is not located within the orientation range, for example, the device having the distributed stream transfer service, the device currently in a power-on state, the device closest to the user, or the device selected by the user from the displayed device list.

In the third case, there is only the untrusted device in the surrounding device.

For example, if there is one untrusted device, the first electronic device may directly establish a connection to the untrusted device; or before establishing a connection to the untrusted device, the first electronic device requests the user to determine whether to establish a connection to the untrusted device. If a determining instruction from the user is received, the first electronic device establishes the connection to the untrusted device. If there are a plurality of untrusted devices, the first electronic device may select an optimal device to establish the connection. The optimal device selected from the plurality of untrusted devices meets at least one of the following: a device having the distributed transfer service, a device located within the preset orientation range, a device at an optimal angle within the preset orientation range, a device currently in a power-on state, a device closest to the user, a device selected by the user from the device list, and the like. Optionally, after selecting the optimal device, the first electronic device requests the user to determine whether to establish the connection to the device. If the determining instruction from the user is received, the first electronic device establishes the connection to the device.

After determining the second electronic device from the surrounding device, the first electronic device may send a connection request to the second electronic device, where the connection request is for requesting a connection to the second electronic device. In an embodiment of this application, the connection request carries a preset identifier, for example, a "Summon" identifier. The identifier indicates the second electronic device to return first information. To be specific, the first electronic device triggers the connection to the second electronic device by using the preset gesture operation, and retrieves the first information of the second electronic device. Alternatively, the connection request may not carry the preset identifier. After being connected to the first electronic device based on the connection request, the second electronic device actively returns the first information to the first electronic device.

S603: The first electronic device receives the first information sent by the second electronic device.

It may be understood that, before S603, the method further includes: The second electronic device sends the first information to the first electronic device. In some embodiments, the first information sent by the second electronic device is related to a current status and a current display interface of the second electronic device.

For example, when the current running status of the second electronic device is a power-off state, the first information sent by the second electronic device includes information indicating that the second electronic device is powered off. In this way, the first electronic device may display, based on the first information, a control interface for controlling the second electronic device to be powered on. When the current running status of the second electronic device is a screen-off state, the first information sent by the second electronic device includes information indicating that the second electronic device is screened off. In this way, the first electronic device may display, based on the first information, a control interface for controlling the second electronic device to be screened on.

Figure 11:
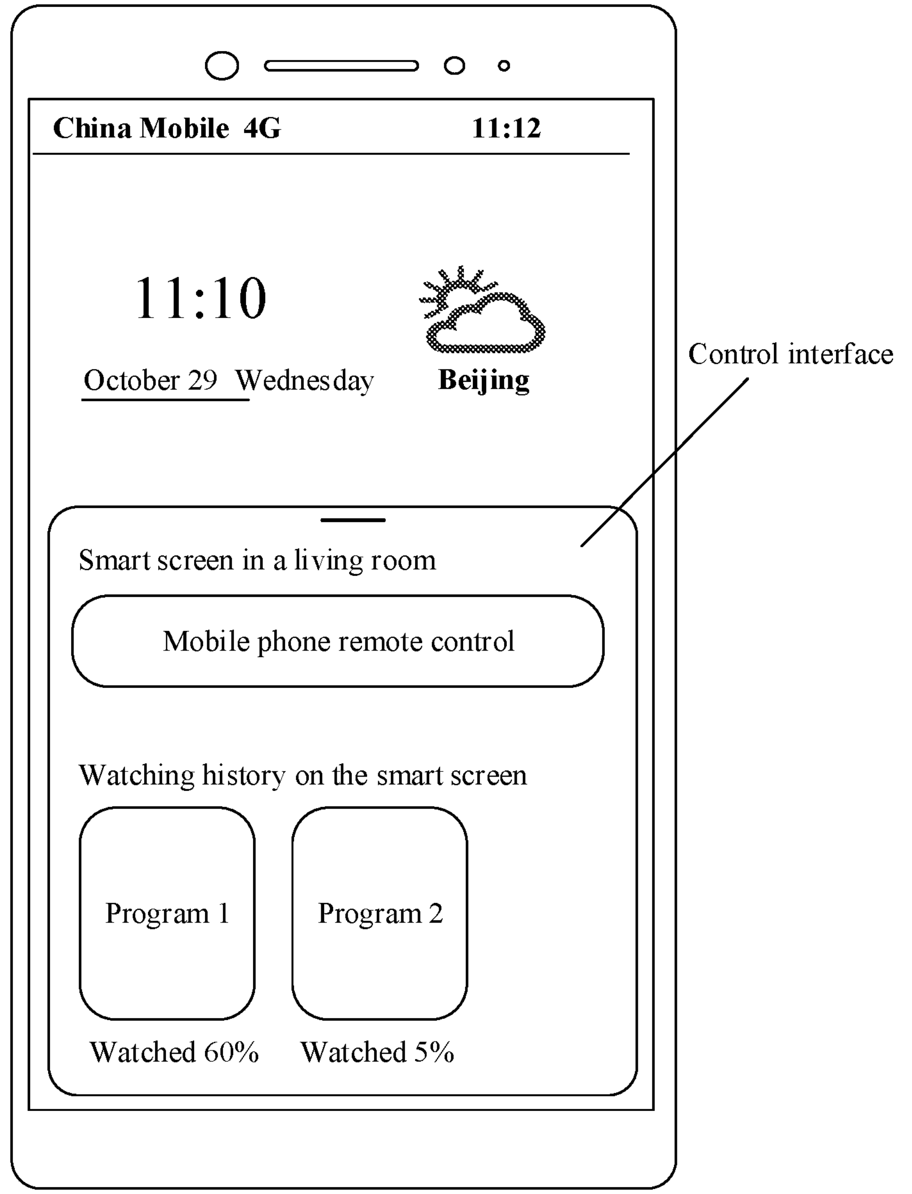
FIG. 11 is a schematic diagram of a control interface on a first electronic device according to an embodiment of this application.

For another example, when the current display interface of the second electronic device is a main interface, the first information sent by the second electronic device may include related information of the second electronic device. The related information of the second electronic device may include at least one of the current running status of the second electronic device, a historical watching or historical use record of the second electronic device, recommended content based on the historical watching or historical use record, an application and/or a function having the distributed transfer service on the second electronic device, a current running application on the second electronic device, an application displayed at a topmost layer on the second electronic device, and the application and/or the function that have/has the distributed transfer service and that are/is used by the second electronic device last time. For example, the current running status of the second electronic device includes power-on, power-off, or the like. The historical watching or historical use record of the second electronic device may include a historically played video, a used function, a started application, and the like on the second electronic device, and may further include historical watching or historical use progress, such as playing progress of the historically played video, for example, 60% of the played video. The recommended content based on the historical watching record may include, for example, a video that is recommended to the user based on the historically played video and that the user may be interested in. In this way, the first electronic device may display, based on the related information of the second electronic device, a control interface (which is referred to as a general-purpose control interface) for controlling the second electronic device. For example, FIG. 11 is a schematic diagram of a general-purpose control interface displayed by the first electronic device (namely, a mobile phone) based on related information of the second electronic device (for example, a television). The control interface includes a historical watching record, watching progress, and the like.

For another example, when the current display interface of the second electronic device is an interface of the first application and/or the first function, if the first application and the first function do not support the distributed transfer service, the first information sent by the second electronic device includes the related information of the second electronic device, and is for displaying the general-purpose control interface. For details, refer to the foregoing descriptions. Alternatively, if the first application and the first function support the distributed transfer service, the first information sent by the second electronic device includes related information of the first application and/or the first function. The first application and/or the first function may include at least one of a current running status (for example, an enabled state or a disabled state) of the first application and/or the first function, a historical watching or historical use record of the first application and/or the first function, content recommended by the first application and/or the first function based on the historical use record, a function having the distributed transfer service in the first application, and a function that has the distributed transfer service that is used in the first application last time. In this way, the first electronic device may display, based on the interface of the first application and/or the first function, a control interface (namely, an application control interface) for controlling the first application and/or the first function. Details are described below.

S604: The first electronic device displays the control interface based on the first information, where the control interface is for controlling the second electronic device.

The control interface may be displayed at any location of the first electronic device. This is not limited in embodiments of this application. For example, as shown in FIG. 11, the control interface is displayed on a lower half part of a display of the first electronic device (for example, the mobile phone).

In some embodiments, display content of the control interface displayed on the first electronic device is related to a current running status and/or a current display interface of the second electronic device.

Figure 12A:
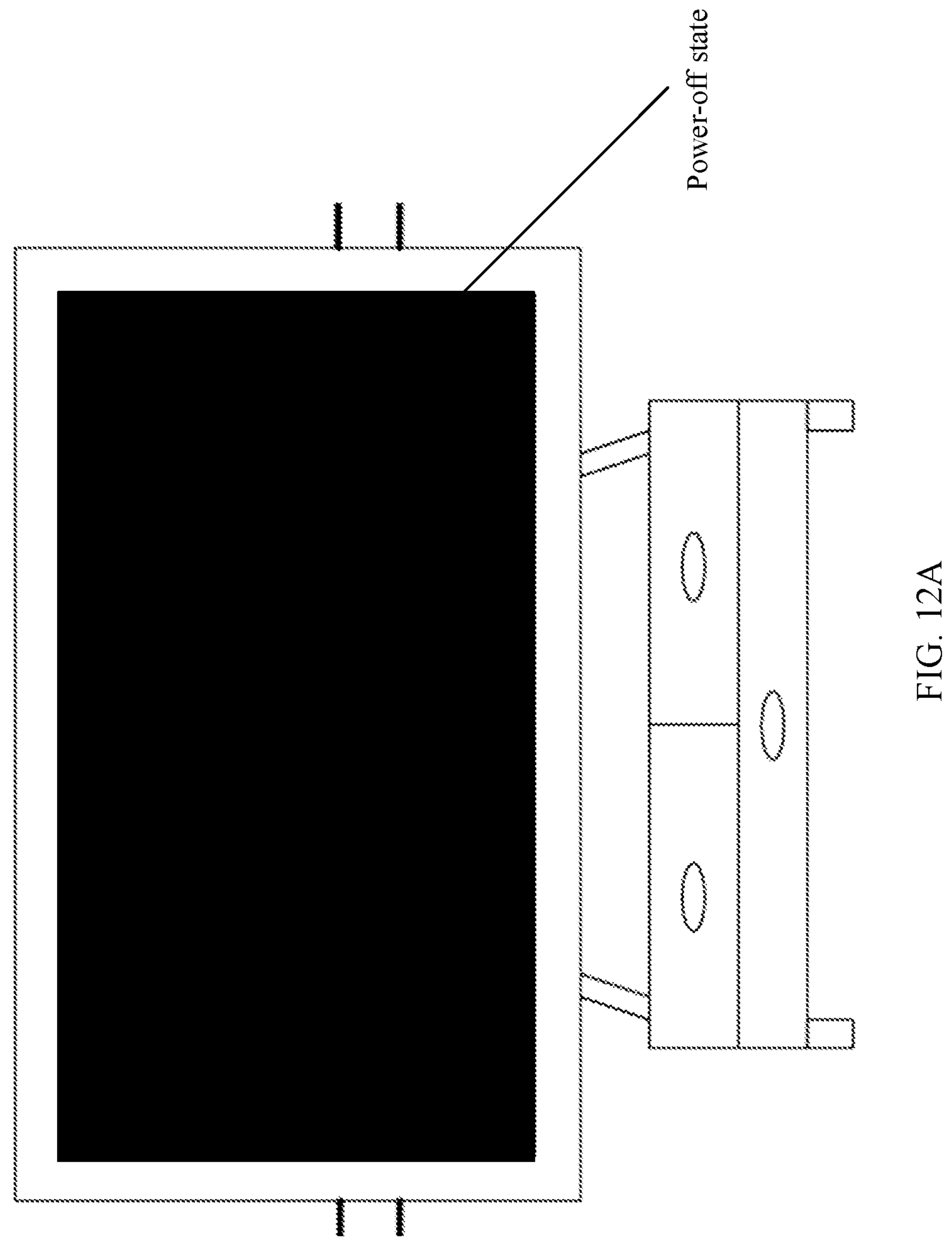
FIG. 12A to FIG. 14B are schematic diagrams of an application scenario according to an embodiment of this application.
Figure 12B:
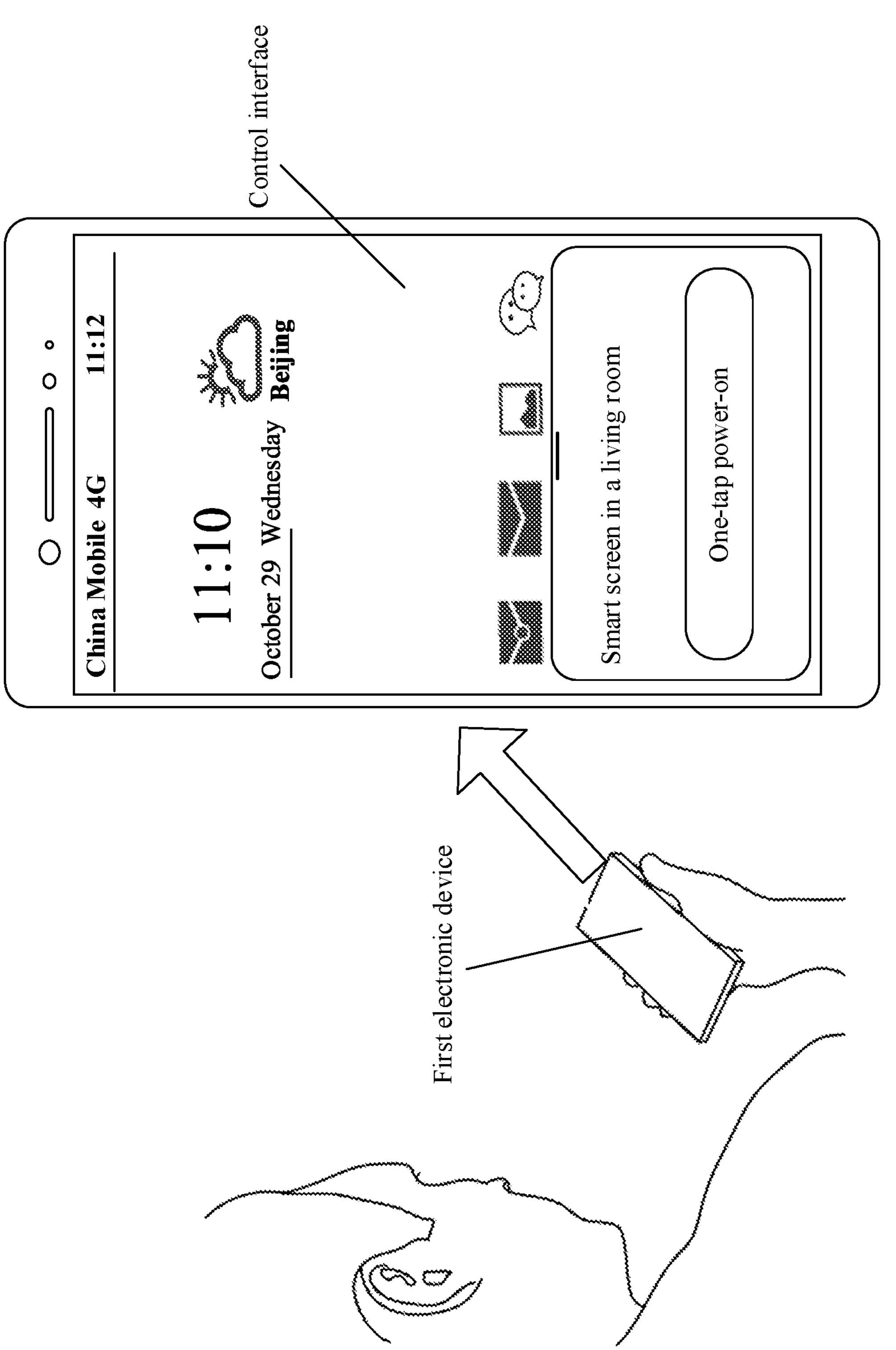

For example, when the current running status of the second electronic device is a power-off state, the control interface on the first electronic device displays a button for indicating to control the second electronic device to be powered on. For example, as shown in FIG. 12A and FIG. 12B, an example in which the first electronic device is a mobile phone and the second electronic device is a television is used. When the television is powered off, the control interface on the mobile phone displays a "One-tap power-on" button. When detecting that the user triggers the "One-tap power-on" button, the mobile phone sends a power-on instruction to the television, to control the television to be powered on.

For example, when the current running status of the second electronic device is a screen-off state, the control interface on the first electronic device displays a button for indicating to control the second electronic device to be screened on.

Figure 13A:
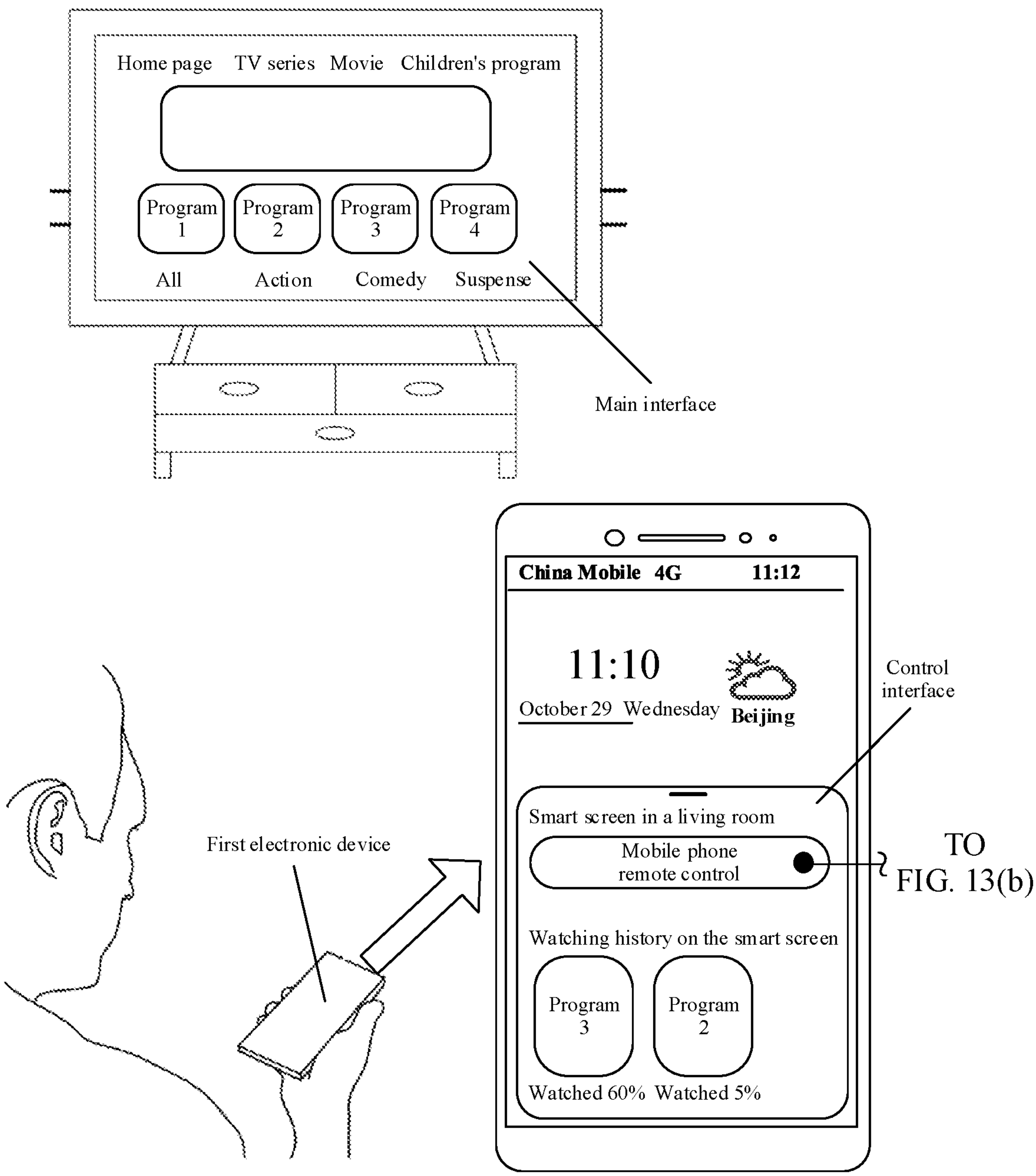
Figure 13B:
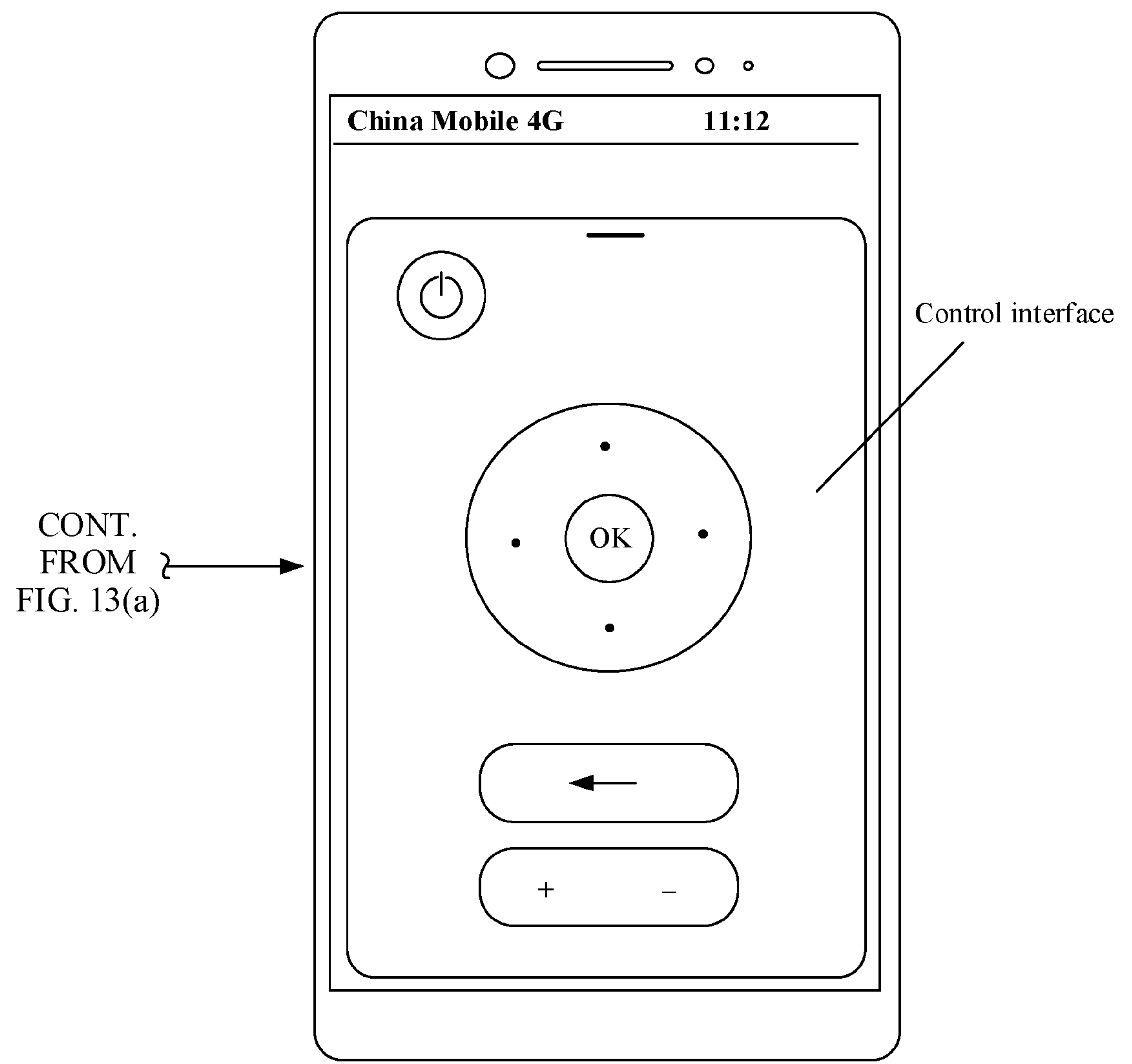

For example, when the current display interface of the second electronic device is a main interface, the control interface on the first electronic device may be a general-purpose control interface, and the general-purpose control interface displays the related information of the second electronic device. For example, as shown in FIG. 13(*a*), when the television displays the main interface, the control interface (namely, the general-purpose control interface) on the mobile phone displays a historical watching record of the television, and further displays watching progress, and the like. The control interface further displays a mobile phone remote control. When the mobile phone detects that the user taps the mobile phone remote control, an interface shown in FIG. 13(*b*) is displayed. The interface is for controlling a volume, power-on/off, and the like of the television.

Figure 14A:
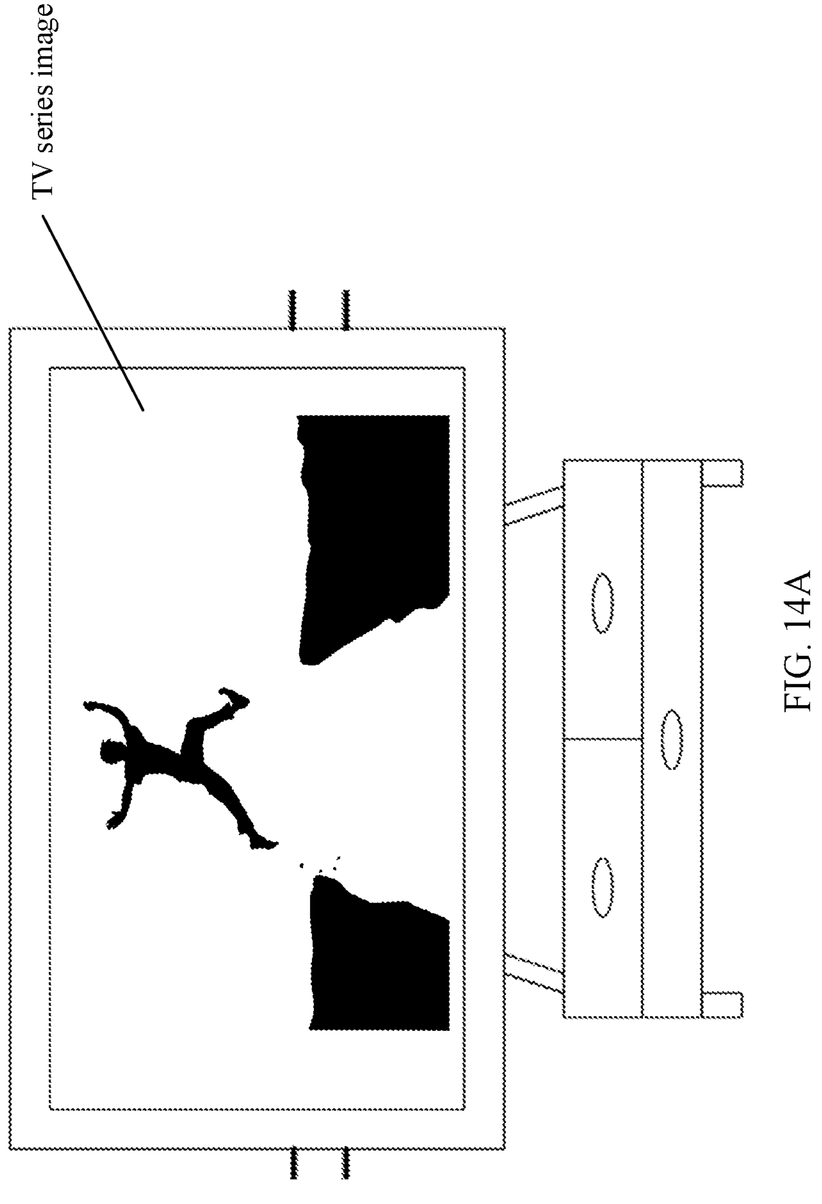
Figure 14B:
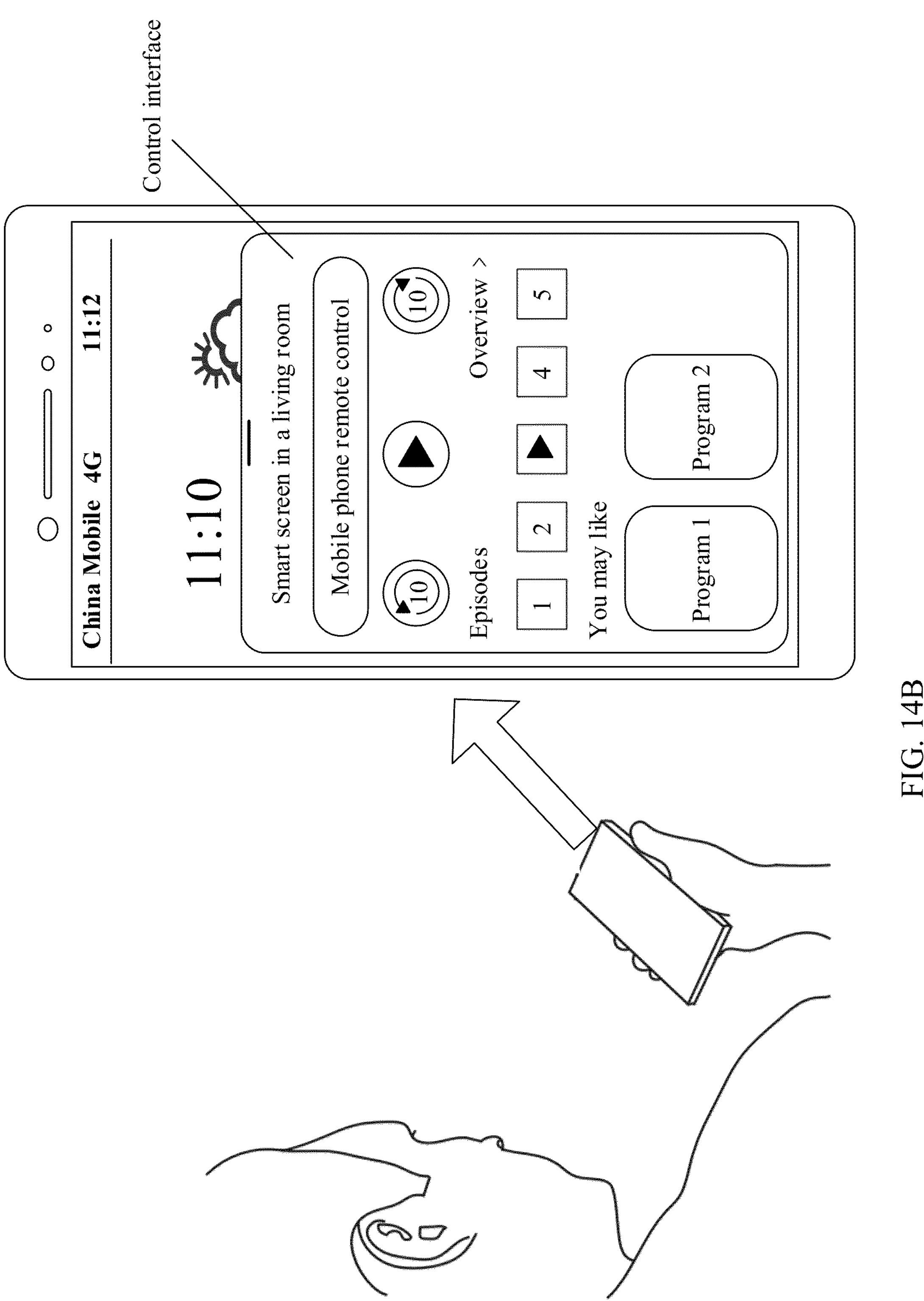

For example, when the current display interface of the second electronic device is an interface of the first application and/or the interface of the first function, the control interface displayed on the first electronic device may be a general-purpose control interface or an application control interface corresponding to the first application and/or the first function. Specifically, when the first application has a corresponding application control interface (in other words, the first application supports the distributed transfer service), the first electronic device displays the application control interface; or when the first application does not have a corresponding application control interface (in other words, the first application does not support the distributed transfer service), the first electronic device displays the general-purpose control interface. The application control interface corresponding to the first application includes related information of the first application, and the general-purpose control interface displays the related information of the second electronic device. For example, as shown in FIG. 14A and FIG. 14B, when the television runs a video playing application (namely, the first application), a foreground displays a TV series image played by the video playing application, and the control interface on the mobile phone is an application control interface (a personalized control interface) corresponding to the video playing application. The application control interface includes buttons for controlling the video playing application, such as a pause button and an episode selection button, and may further display a recommended movie or TV series.

Figure 15:
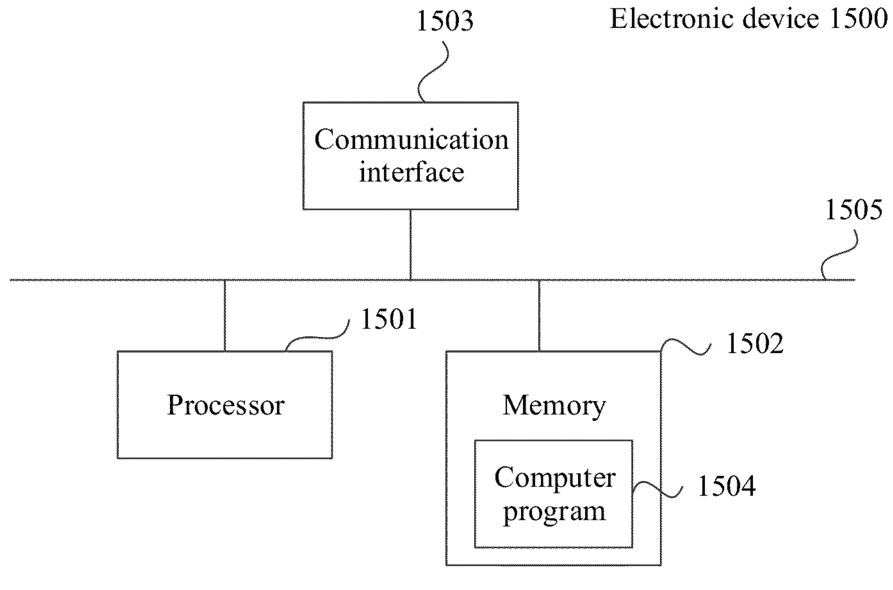
FIG. 15 is a schematic diagram of an electronic device according to an embodiment of this application.

Based on a same concept, FIG. 15 is a schematic diagram of a structure of an electronic device 1500 according to an embodiment of this application. The electronic device 1500 may be the foregoing first electronic device or the foregoing second electronic device. As shown in FIG. 15, the electronic device 1500 may include one or more processors 1501, one or more memories 1502, a communication interface 1503, and one or more computer programs 1504. The components may be connected through one or more communication buses 1505. The one or more computer programs 1504 are stored in the memories 1502 and are configured to be executed by the one or more processors 1501. The one or more computer programs 1504 include instructions. For example, the instructions may be used to perform related steps of a main device in the foregoing corresponding embodiments. The communication interface 1503 is configured to implement communication between the main device and another device (for example, a target device). For example, the communication interface may be a transceiver.

Based on a same concept, an embodiment of this application further provides a communication system. The communication system includes a first electronic device and a second electronic device. For example, the first electronic device may be a device with a display, like a mobile phone, a tablet computer, a PC, or a watch. The second electronic device may be a large-screen device like a tablet computer, a PC, or a television. For structures of the first electronic device and the second electronic device, refer to FIG. 15. For example, when the electronic device 1500 shown in FIG. 15 is the first electronic device, and instructions of the one or more computer programs 1504 are executed by the processors, the first electronic device is enabled to perform the foregoing steps of the first electronic device (for example, a mobile phone). When the electronic device 1500 shown in FIG. 15 is the second electronic device, and instructions of the one or more computer programs 1504 are executed by the processors, the second electronic device is enabled to perform the foregoing steps of the second electronic device (for example, a television).

In the foregoing embodiments provided in this application, the method provided in embodiments of this application is described from a perspective of an electronic device serving as an execution body. To implement the functions in the method provided in the foregoing embodiments of this application, the electronic device may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, procedures or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In a case in which no conflict occurs, the solutions in the foregoing embodiments may be combined for use.

It should be noted that a part of this patent application document includes copyright-protected content. The copyright owner reserves the copyright except copies are made for the patent documents or the recorded content of the patent documents in the Patent Office.

What is claimed is:

1. A device control method, wherein the method comprises:

establishing, by a first electronic device, a connection to a second electronic device in response to a preset gesture operation;

receiving, by the first electronic device, first information sent by the second electronic device, wherein the first information comprises related information of the second electronic device and/or related information of a first application and/or a first function on the second electronic device; and displaying, by the first electronic device, a control interface based on the first information, wherein the control interface is for controlling the second electronic device, wherein the establishing, by the first electronic device, the connection to the second electronic device in response to the preset gesture operation comprises:

determining, by the first electronic device, the second electronic device from a surrounding device in response to the preset gesture operation, and establishing the connection to the second electronic device, wherein the second electronic device satisfies at least one of the following conditions: the second electronic device supports a distributed transfer service, the second electronic device is a trusted device of the first electronic device, the second electronic device is located within a preset orientation range of the first electronic device, a distance between the second electronic device and the first electronic device falls within a preset distance range, and the second electronic device is specified by the user; and that the second electronic device supports a distributed transfer service includes that the second electronic device can transfer an application or an application interface, or a function or a function interface on the second electronic device to another electronic device.

2. The method according to claim 1, wherein the establishing, by the first electronic device, a connection to a second electronic device in response to a preset gesture operation comprises:

sending, by the first electronic device, a connection request to the second electronic device in response to the preset gesture operation, wherein the connection request carries a preset identifier, and the preset identifier indicates to the second electronic device to return the first information.

3. The method according to claim 1, wherein the preset gesture operation comprises:

swinging a first edge of the first electronic device around a first axis as a rotation axis, wherein the first edge is an edge of the first electronic device that is closest to a user when the user holds the first electronic device, and the first axis passes through a central point of the first electronic device and is parallel to the first edge.

4. The method according to claim 3, wherein the preset gesture operation satisfies at least one of the following:

a swing angle at which the first edge is swung around the first axis as the rotation axis falls within a preset angle range;

a swing angular velocity at which the first edge is swung around the first axis as the rotation axis falls within a preset angular velocity range;

a quantity of swing times for which the first edge is swung within a preset duration around the first axis as the rotation axis is greater than a preset quantity of times;

a time interval at which the first edge is continuously swung twice around the first axis as the rotation axis is less than a preset time interval; and a tilt angle of the first edge in a horizontal direction is less than a preset angle when the first edge is swung around the first axis as the rotation axis.

5. The method according to claim 1, wherein that the second electronic device is a trusted device of the first electronic device comprises at least one of the following: logging in to a same account as the first electronic device, being connected to a same local area network as the first electronic device, having been connected to or interacted with the first electronic device, and being located within a same geographic area as the first electronic device.

6. The method according to claim 1, wherein that the second electronic device is located within a preset orientation range of the first electronic device comprises:

the second electronic device is located within a preset angle range of the first electronic device that uses a direction of a second axis as a center, wherein the second axis passes through a central point of the first electronic device and is perpendicular to a first edge, and the first edge is the edge of the first electronic device that is closest to the user when the user holds the first electronic device.

7. The method according to claim 1, wherein the first information comprises at least one of the following:

a current running status of the second electronic device;

a historical watching or historical use record of the second electronic device;

content recommended by the second electronic device based on the historical watching record;

an application and/or a function that have/has the distributed transfer service on the second electronic device;

a currently running application on the second electronic device;

an application displayed at a topmost layer on the second electronic device; and the application and/or the function that have/has the distributed transfer service and that are/is used by the second electronic device last time, wherein the application and/or the function that have/has the distributed transfer service means that the application and/or the function can transfer an interface of the application and/or the function to another device.

8. The method according to claim 1, wherein the related information of the first application and/or the first function comprises:

a current running status of the first application and/or the first function;

a historical use record of the first application and/or the first function;

content recommended by the first application and/or the first function based on the historical use record;

a function having the distributed transfer service in the first application; and a function that has the distributed transfer service and was last used in the first application.

9. The method according to claim 1, wherein display content of the control interface on the first electronic device is related to a current running status and/or a current display interface of the second electronic device.

10. The method according to claim 9, wherein based on the current display interface of the second electronic device being a main interface, the control interface on the first electronic device is a general-purpose control interface, wherein the general-purpose control interface comprises the related information of the second electronic device, and the general-purpose control interface is for controlling the entire second electronic device; or based on the current display interface of the second electronic device being an interface of the first application and/or the first function, the control interface on the first electronic device is the general-purpose control interface or a personalized control interface corresponding to the first application and/or the first function, wherein the personalized control interface comprises the related information of the first application and/or the first function, and the personalized control interface is for controlling the first application and/or the first function; or based on the current running status of the second electronic device being a power-off state, the control interface on the first electronic device comprises a button for indicating to control the second electronic device to be powered on; or based on the current running status of the second electronic device being a screen-off state, the control interface on the first electronic device comprises a button for indicating to control a screen of the second electronic device to be turned on.

11. A device control method, wherein the method comprises:

establishing, by a second electronic device, a connection to a first electronic device; and sending, by the second electronic device, first information to the first electronic device, wherein the first information comprises related information of the second electronic device and/or related information of a first application and/or a first function on the second electronic device, wherein the first information is for generating a control interface, and the control interface can be for controlling the second electronic device, wherein N icons are displayed on the second electronic device, and each icon of the N icons corresponds to a corresponding application and/or function; identifiers are respectively displayed on M icons in the N icons, and the identifiers are for prompting that applications and/or functions corresponding to the M icons support the distributed transfer service, wherein N and M are positive integers, and N is greater than or equal to M:

the first application and/or the first function are/is an application and/or a function corresponding to a first icon in the M icons; and that the application and/or the function support/supports the distributed transfer service comprises: the application and/or the function can transfer the interface of the application and/or the function to the another device.

12. The method according to claim 11, wherein before the sending, by the second electronic device, first information to the first electronic device, the method further comprises:

receiving, by the second electronic device, a request sent by the first electronic device, wherein the request carries a preset identifier, and the preset identifier indicates to the second electronic device to return the first information.

13. The method according to claim 11, wherein the first information is related to a current running status and/or a current display interface of the second electronic device.

14. The method according to claim 13, wherein based on the current display interface of the second electronic device being a main interface, the first information comprises the related information of the second electronic device, wherein the first information is for generating a general-purpose control interface, and the general-purpose control interface is for controlling the entire second electronic device; or based on the current display interface of the second electronic device being an interface of the first application and/or the first function, the first information comprises the related information of the first application and/or the first function, wherein the first information is for generating a personalized control interface of the first application and/or the first function, and the personalized control interface is for controlling the first application and/or the first function; or based on the current running status of the second electronic device being a power-off state, the first information comprises information indicating that the second electronic device is currently powered off, wherein the first information is for generating the control interface, and the control interface comprises a button for controlling the second electronic device to be powered on; or based on the current running status of the second electronic device being a screen-off state, the first information comprises information indicating that a screen of the second electronic device is currently turned off, wherein the first information is for generating the control interface, and the control interface comprises a button for controlling the screen of the second electronic device to be turned on.

15. The method according to claim 11, wherein the first information comprises at least one of the following:

a current running status of the second electronic device;

a historical watching or historical use record of the second electronic device;

content recommended by the second electronic device based on the historical watching record;

an application and/or a function that have/has a distributed transfer service on the second electronic device;

a currently running application on the second electronic device;

an application displayed at a topmost layer on the second electronic device; and the application and/or the function that have/has the distributed transfer service and that are/is used by the second electronic device last time, wherein the application and/or the function that support/supports the distributed transfer service means that the application and/or the function can transfer an interface of the application and/or the function to another device.

16. The method according to claim 11, wherein the related information of the first application and/or the first function comprises:

a current running status of the first application and/or the first function;

a historical use record of the first application and/or the first function;

content recommended by the first application and/or the first function based on the historical use record;

a function having the distributed transfer service in the first application; and a function that has the distributed transfer service and that was last used in the first application.

17. A first electronic device, comprising:

a processor, a memory, and one or more programs, wherein the one or more programs are stored in the memory, the one or more programs comprise instructions, and when the instructions are executed by the processor, the first electronic device is enabled to establish a connection to a second electronic device in response to a preset gesture operation;

receive first information sent by the second electronic device, wherein the first information comprises related information of the second electronic device and/or related information of a first application and/or a first function on the second electronic device; and display a control interface based on the first information, wherein the control interface is for controlling the second electronic device, wherein the first electronic device being enabled to establish the connection to the second electronic device in response to the preset gesture operation includes the first electronic device being enabled to:

determine the second electronic device from a surrounding device in response to the preset gesture operation, and establish the connection to the second electronic device, wherein the second electronic device satisfies at least one of the following conditions: the second electronic device supports a distributed transfer service, the second electronic device is a trusted device of the first electronic device, the second electronic device is located within a preset orientation range of the first electronic device, a distance between the second electronic device and the first electronic device falls within a preset distance range, and the second electronic device is specified by the user; and that the second electronic device supports a distributed transfer service includes that the second electronic device can transfer an application or an application interface, or a function or a function interface on the second electronic device to another electronic device.

18. A second electronic device, comprising:

a processor, a memory, and one or more programs, wherein the one or more programs are stored in the memory, the one or more programs comprise instructions, and when the instructions are executed by the processor, the second electronic device is enabled to:

establish a connection to a first electronic device; and send first information to the first electronic device, wherein the first information comprises related information of the second electronic device and/or related information of a first application and/or a first function on the second electronic device, wherein the first information is for generating a control interface, and the control interface can be for controlling the second electronic device, wherein N icons are displayed on the second electronic device, and each icon of the N icons corresponds to a corresponding application and/or function; identifiers are respectively displayed on M icons in the N icons, and the identifiers are for prompting that applications and/or functions corresponding to the M icons support the distributed transfer service, wherein N and M are positive integers, and N is greater than or equal to M;

the first application and/or the first function are/is an application and/or a function corresponding to a first icon in the M icons; and that the application and/or the function support/supports the distributed transfer service comprises: the application and/or the function can transfer the interface of the application and/or the function to the another device.

* * * * *